United States Patent [19]
Imanishi et al.

[11] Patent Number: 6,117,043
[45] Date of Patent: Sep. 12, 2000

[54] CONTINOUSLY VARIABLE TRANSMISSION HAVING AN OSCILLATING TRUNNION-SUPPORT YOKE

[75] Inventors: Takashi Imanishi, Yokohama; Shinji Miyata; Hiroyuki Itoh, both of Fujisawa, all of Japan

[73] Assignee: NSK Ltd., Tokyo, Japan

[21] Appl. No.: 09/185,708

[22] Filed: Nov. 4, 1998

[30] Foreign Application Priority Data

Nov. 5, 1997 [JP] Japan .................................. 9-302568
Dec. 12, 1997 [JP] Japan .................................. 9-343276

[51] Int. Cl.$^7$ .................................................. F16H 15/38
[52] U.S. Cl. .......................... 476/46; 476/40; 476/45
[58] Field of Search .............................. 476/40, 42, 45, 476/46

[56] References Cited

U.S. PATENT DOCUMENTS

| | | | |
|---|---|---|---|
| 3,153,938 | 10/1964 | De Brie Perry | 476/40 |
| 3,159,042 | 12/1964 | Kraus | 476/40 |
| 5,111,710 | 5/1992 | Perry | 74/200 |
| 5,820,512 | 10/1998 | Nakano | 476/40 |
| 5,916,057 | 6/1999 | Waltz et al. | 476/40 |

FOREIGN PATENT DOCUMENTS

| | | |
|---|---|---|
| 1-32379 | 6/1989 | Japan . |
| 2-283949 | 11/1990 | Japan . |
| 5-16443 | 4/1993 | Japan . |
| 5-126222 | 5/1993 | Japan . |
| 5-18523 | 5/1993 | Japan . |
| 6-34010 | 2/1994 | Japan . |
| 8-19998 | 3/1996 | Japan . |
| 8-23386 | 3/1996 | Japan . |

*Primary Examiner*—David M. Fenstermacher
*Attorney, Agent, or Firm*—Vorys, Sater, Seymour and Pease, LLP

[57] ABSTRACT

In a continuously variable transmission yokes for supporting pivot shafts provided on the end portions of trunnions are supported for displacement only in the axial direction of the pivot shafts and oscillation in a predetermined direction, relative to a support post fixed to the inner surface of a casing. By this construction, the contact pressure between the peripheral surfaces of a pair of power rollers supported on a pair of trunnions supported by the yokes and the inner sides of input side and output side discs is made uniform.

8 Claims, 15 Drawing Sheets

PRIOR ART FIG. 8
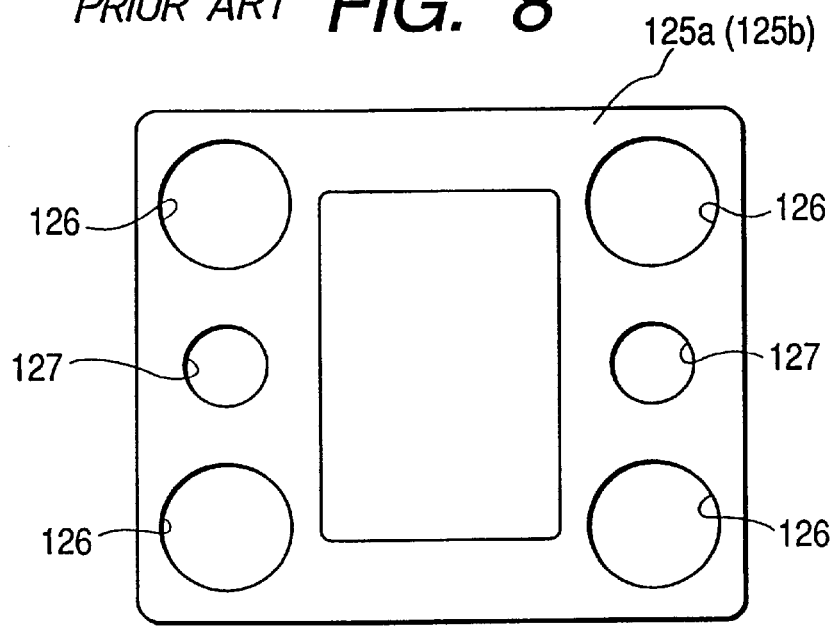
FIG. 9
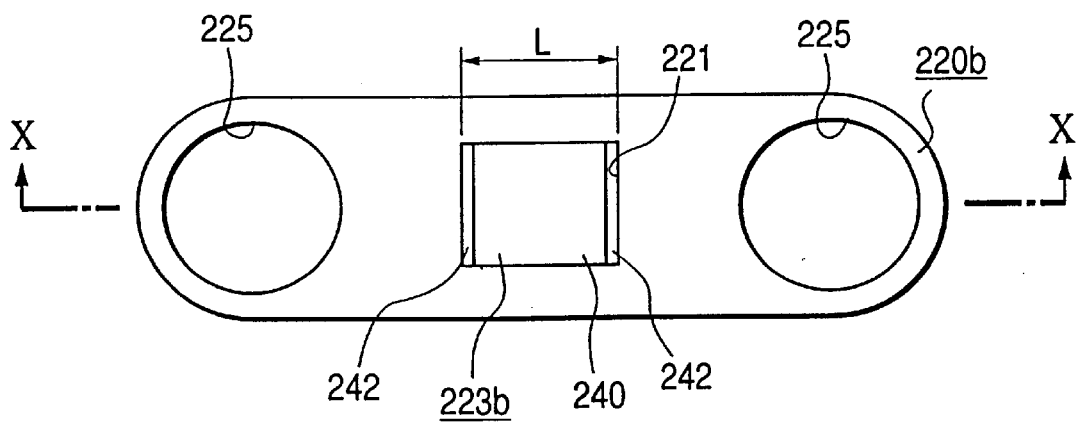
FIG. 10
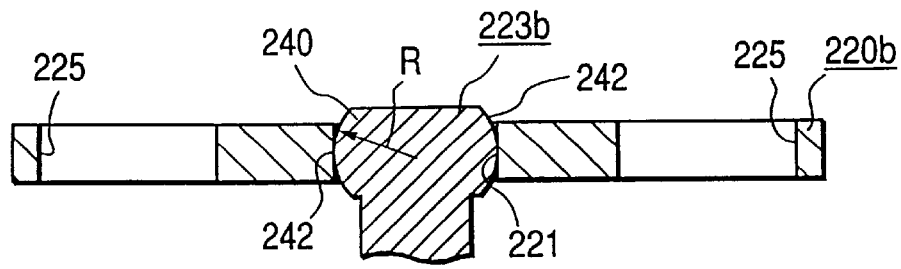

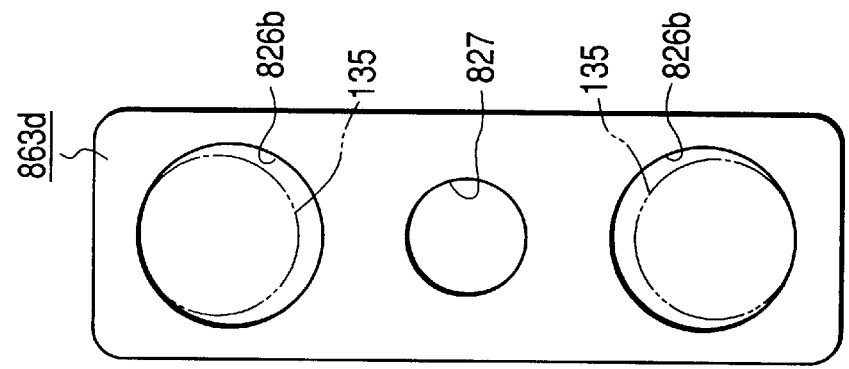
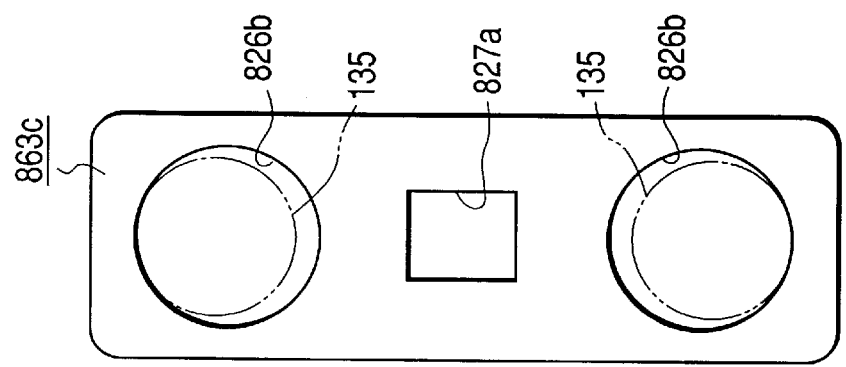
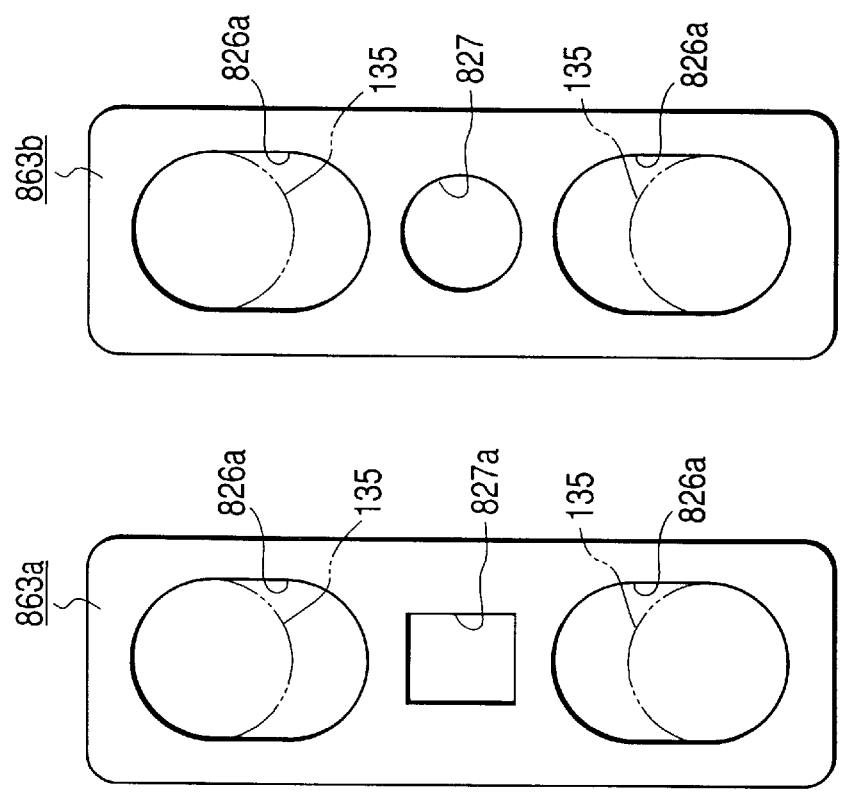
FIG. 27A  FIG. 27B  FIG. 27C  FIG. 27D

CONTINUOUSLY VARIABLE TRANSMISSION HAVING AN OSCILLATING TRUNNION-SUPPORT YOKE

BACKGROUND OF THE INVENTION

1. Field of the Invention

This invention relates to a continuously variable transmission for use in various vehicles such as automobiles or various industrial machines, and particularly to the yoke thereof and improvements in the engagement between the yoke and a support post or a trunnion.

2. Related Background Art

Continuously variable transmissions of various types have been used and one of them is a toroidal type continuously variable transmission. This is a transmission in which the opposed surfaces of an input disc mounted on an input shaft and an output disc mounted on an output shaft are formed by toroidal surfaces. A power roller is disposed between these toroidal surfaces, and by the oscillated state (angle) thereof being changed, the transmission ratio between the input shaft and the output shaft can be changed.

FIGS. 1 and 2 of the accompanying drawings show a toroidal type continuously variable transmission of the single cavity type described in Japanese Patent Publication No. 8-19998. It includes an input shaft 15, an input disc 2 and an output disc 4 disposed thereon, yokes 20a and 20b supported by a casing 22, trunnions 6 supported by the casing 22 and the yokes 20a, 20b, a power roller 8 supported by the trunnions 6 and located between the two discs, etc.

The input side disc 2 and the output side disc 4 are rotatably supported around the tubular input shaft 15 through needle bearings 16. Also, a cam plate 10 is spline-engaged with the outer peripheral surface of an end portion (the left end portion as viewed in FIG. 1) of the input shaft 15, and is prevented from moving away from the input side disc 2 by a flange portion 17. This cam plate 10 and rollers 12 together constitute a pressing device 9 of the loading cam type for rotating the input side disc 2 while pressing the input side disc 2 toward the output side disc 4 on the basis of the rotation of the input shaft 15. An output gear 18 is coupled to the output side disc 4 by keys 19 so that the two may be rotated in synchronism with each other.

Pivot shafts 5 provided on the upper and lower end portions of the pair of trunnions 6 extending vertically as viewed in FIG. 2 are supported for oscillation relative to the pair of yokes 20a and 20b extending horizontally and for displacement in the axial direction (the front-to-back direction as viewed in FIG. 1, or the vertical direction as viewed in FIG. 2). That is, the pivot shafts 5 are rotatably supported inside circular holes 25 formed in the left and right end portions of the yokes 20a and 20b, through radial needle bearings 26. The outer peripheral surfaces of the outer races 27 of these radial needle bearings 26 are made into spherical convex surfaces and are fitted inside the circular holes 25 for oscillation and axial displacement.

The yokes 20a and 20b are provided parallel to each other between the input side disc 2 and the output side disc 4 so as to sandwich the input shaft 15 therebetween. Such yokes 20a and 20b are formed into an elliptical shape or a long rectangular shape as shown in FIG. 4 of the accompanying drawings by subjecting a thick steel plate to the forging work of punching it, and have sufficient rigidity.

These yokes 20a and 20b are supported for some displacement on the inner surface of the casing 22 containing the body of the continuously variable transmission therein.

That is, restraining holes 21a and 21b are formed in the intermediate portions of the yokes 20a and 20b, respectively, and a pair of support posts 23a and 23b are secured on the same straight line at the vertically opposite sides of the inner surface of the casing 22. The outer peripheral surface of the tip end portion of one (lower as viewed in FIG. 2) support post 23a is made into a spherical convex surface, and the inner peripheral surface of the restraining hole 21a formed in the intermediate portion of the yoke 20a which corresponds thereto is made into a spherical concave surface, and the tip end portion of the support post 23a is fitted in this restraining hole 21a. Accordingly, the yoke 20a is supported on the tip end portion of the support post 23a for oscillation and displacement.

In contrast, the outer peripheral surface of the intermediate portion of the other (upper as viewed in FIG. 2) support post 23b is made into a rectangular cylindrical shape, and the inner peripheral surface of the restraining hole 21b formed in the intermediate portion of the other yoke 20b which corresponds thereto is made into a rectangular cylindrical shape in which the longer side of the cross-sectional shape is longer than the longer side of the cross-sectional shape of the intermediate portion of the support post 23b. Accordingly, a gap 24 as shown in FIG. 4 is present between the inner peripheral surface of the restraining hole 21b and the outer peripheral surface of the intermediate portion of the yoke 20b in a state in which the yoke 20b is fitted on the intermediate portion of the support post 23b. As the result, the yoke 20b is supported for oscillatory displacement about a line X—X and some displacement in a lengthwise direction relative to the support post 23b.

Circular holes 28 are formed in the intermediate portions of the trunnions 6 supported for oscillation and axial displacement inside the casing 22 through the yokes 20a and 20b in the manner described above, and displaceable shafts 7 are supported therein. These displaceable shafts 7 have support shaft portions 29 parallel to each other and eccentric with respect to each other and pivot shaft portions 30, and are provided at opposite sides of 180° with the input shaft 15 therebetween. The support shaft portions 29 are rotatably supported inside the circular holes 28 through radial needle bearings 31, and the power rollers 8 are rotatably supported around the pivot shaft portions 30 through radial needle bearings 32.

The direction in which the pivot shaft portions 30 of the displaceable shafts 7 are eccentric relative to the support shaft portions 29 is the same direction with respect to the direction of rotation of the input side and output side discs 2 and 4 (the inverse vertical direction as viewed in FIG. 2) and is the direction substantially orthogonal to the direction of disposition of the input shaft 15 (the horizontal direction as viewed in FIG. 1 or the front to back direction as viewed in FIG. 2). Accordingly, the power rollers 8 are supported for some displacement in the direction of disposition of the input shaft 15. As the result, even when the power rollers 8 tend to be displaced axially of the input shaft 15 due to the fluctuation or the like of the amount of elastic deformation of each constituent member based on the fluctuation of torque transmitted by the toroidal type continuously variable transmission, this displacement can be absorbed without any unreasonable force being applied to each constituent part.

Also, thrust ball bearings 33 and thrust bearings 34 are provided between the outer sides of the power rollers 8 and the inner sides of the intermediate portions of the trunnions 6. The thrust ball bearings 33 support a load in the thrust direction applied to the power rollers 8 and yet permit the rotation thereof. Also, the thrust bearings 34 support a thrust load applied to the outer races 35 of the thrust ball bearings 33 and yet permit the pivot shaft portions 30 and the outer races 35 to oscillate about the support shaft portions 29.

Further, driving rods 36 are coupled to one end portion (the lower end portion as viewed in FIG. 2) of the trunnions 6, and driving pistons 37 secured to the outer peripheral surfaces of the intermediate portions thereof are oil-tightly fitted in driving cylinders 38. These driving pistons 37 and driving cylinders 38 together constitute an actuator for displacing the trunnions 6 axially of the pivot shafts 5. Also, oil pressure can be supplied into and discharged from the driving cylinders 38 on the basis of the changeover of a control value 39.

During the operation of the toroidal type continuously variable transmission, the rotation of the input shaft 15 is transmitted to the input side disc 2 through the pressing device 9, is further transmitted to the output side disc 4 through the pair of power rollers 8, and is taken out from the output gear 18.

When the rotational speed ratio between the input shaft 15 and the output gear 18 is to be changed, the pair of driving pistons 37 are displaced by the same distance in opposite directions on the basis of the changeover of the control value 39, whereupon the pair of trunnions 6 are displaced in opposite directions (the right power roller 8 in FIG. 2 is downwardly displaced and the left power roller 8 is upwardly displaced). As the result, the direction of a force in the tangential direction acting on the portion of contact between the peripheral surfaces 8a of the power rollers 8 and the inner sides 2a and 4a of the input side disc 2 and the output side disc 4 changes and along therewith, the trunnions 6 oscillate in opposite directions about the pivot shafts 5 pivotally supported by the yokes 20a and 20b. As the result, the position of contact between the peripheral surfaces 8a of the power rollers 8 and the inner sides 2a and 4a of the discs 2 and 4 changes and the rotational speed ratio between the input shaft 15 and the output gear 18 changes.

At this time, the yoke 20b is displaced within the range of the gap 24 relative to the support post 23b, whereby the displacement of the driving pistons 37 in the driving cylinders 38 may be effected smoothly. However, there occurs a case where the contact pressure (pressing force) of the portion of contact between the peripheral surfaces 8a of the power rollers 8 supported on the inner sides of the trunnions 6 and the inner sides 2a and 4a of the input side and output side discs 2 and 4 differs between the diametrally opposite sides of the power rollers 8 (the input disc side and the output disc side). This difference in the contact pressure leads to the difference between the operation traction coefficients of the traction portions, and further to the difference between the sliding rates of these traction portions. As the result, the stability of transmission synchronism regarding the pair of power rollers 8 may be spoiled or a greater force may be applied to one traction portion of the input disc side or the output disc side than to the other traction portion, whereby the durability thereof may be spoiled.

The known toroidal type continuously variable transmission also include a so-called double cavity type one in which two sets of input side discs, output side discs and power rollers are provided and these are disposed in parallel to each other relative to the direction of transmission of power. FIGS. 5 to 7 of the accompanying drawings shown an example of it (an example described in Japanese Patent Publication No. 8-23386).

An input shaft 101a is supported for rotation only inside a casing 105, and a tubular transmission shaft 138 is supported around and concentrically with this input shaft 101a for rotation relative thereto. First and second input side discs 116 and 117 are supported on both sides of the intermediate portion of the transmission shaft 138 through ball splines 118 with their inner sides 102a opposed to each other. Accordingly, the first and second input side discs 116 and 117 are disposed concentrically with each other and are rotatable in synchronism with each other.

Also, first and second output side discs 119 and 120 are supported around the intermediate portion of the transmission shaft 138 through a sleeve 121. This sleeve 121 has an output gear 122 integrally provided on the outer peripheral surface of the intermediate portion thereof, and has an inner diameter larger than the outer diameter of the transmission shaft 138, and is supported on a support wall 123 concentrically with the transmission shaft 138 and for rotation only by a pair of antification bearings 124. The first and second output side discs 119 and 120 are spline-engaged with the opposite end portions of the sleeve 121 with their inner sides 4a opposed to each other. Accordingly, the first and second output side discs 119 and 120 are supported concentrically with the first and second input side discs 116 and 117 and for rotation independently thereof with their inner sides 104a opposed to the inner side 102a of one of the first and second input side discs 116 and 117.

A pair of yokes 125a and 125b are supported on the inner surface of the casing 105 and sideways of the first and second input side discs 116 and 117 so as to sandwich them. These yokes 125a and 125b are formed into a rectangular frame-like shape as shown in FIG. 8 by subjecting a metal plate such a steel plate to pressing work or forging work. Circular support holes 126 for pivotally supporting first and second pivot shafts 133 and 134 provided on the opposite end portions of first and second trunnions 131 and 132 which will be described later are formed in the four corners of each of the yokes 125a and 125b, and circular restraining holes 127 are formed in the widthwise (horizontal as viewed in FIG. 6 or vertical as viewed in FIG. 8) central portion of the axial (horizontal as viewed in FIGS. 5 and 8) opposite end portions of the transmission shaft 138 so as to be located between adjacent ones of the support holes 126. The pair of yokes 125a and 125b are supported by support posts 128a and 128b formed on the inner surface of the casing 105. These support posts 128a and 128b are provided in opposed relationship with a first cavity 129 between the inner side 102a of the first input side disc 116 and the inner side 104a of the first output side disc 119 and a second cavity 130 between the inner side 102a of the second input side disc 117 and the inner side 104a of the second output side disc 120, respectively.

Accordingly, the yokes 125a and 125b are supported by the support posts 128a and 128b and have their one end portion opposed to the outer peripheral portion of the first cavity 129 and have their other end portion opposed to the outer peripheral portion of the second cavity 130.

Also, a pair of first trunnions 131 are disposed in the first cavity 129 at the diametrally opposite positions of the first input side disc 116 and the first output side disc 119, and a pair of second trunnions 132 are disposed in the second cavity 130 at the diametrally opposite positions of the second input side disc 117 and the second output side disc 120. First pivot shafts 133 (four in total) provided concentrically with one another on the opposite end portions of the first trunnions 131 are supported for oscillation and axial displacement on the widthwise opposite sides of one end portion of the pair of yokes 125a and 125b, as shown in FIG. 6. That is, inside the support holes 126 formed in one end portion of the yokes 125a and 125b, the first pivot shafts 133 are supported by radial needle bearings 135 comprising an outer race 136 of which the outer peripheral surface is a spherical convex surface and the inner peripheral surface is a cylindrical surface, and a plurality of needles 137. Also, the second trunnions 132 are supported in the second cavity 130 by a structure similar to the first trunnions 131.

As shown in FIG. 6, circular holes 139 are formed in the intermediate portions of the first and second trunnions 131 and 132, and first and second displaceable shafts 140 and 141 are supported therein. The first and second displaceable shafts 140 and 141 have support shaft portions 142 and pivot shaft portions 143 parallel and eccentric to each other, and the support shaft portions 142 are rotatably supported inside the circular holes 139 through radial needle bearings 144. First and second power rollers 145 and 146 are rotatably supported around the pivot shaft portions 143 through radial needle bearings 147.

The pair of first displaceable shafts 140 and the pair of second displaceable shafts 141 provided in the first and second cavities 129 and 130, respectively, are opposed to the input shaft 101a and the transmission shaft 138 on the opposite sides of 180°. Also, the directions in which the pivot shaft portions 143 of the first and second displaceable shafts 140 and 141 are eccentric relative to the support shaft portions 142 are the same directions (vertically opposite directions as viewed in FIG. 6) with respect to the direction of rotation of the first and second input side discs 116 and 117 and the first and second output side discs 119 and 120, and are directions substantially orthogonal to the direction of disposition of the input shaft 115. Accordingly, the first and second power rollers 145 and 146 are supported for some displacement in the direction of disposition of the input shaft 101a and the transmission shaft 138.

As the result, even when due to the fluctuation or the like of the amount of elastic deformation of each constituent member based on the fluctuation of torque transmitted by the toroidal type continuously variable transmission, the first and second power rollers 145 and 146 tend to be displaced in the axial direction (horizontal direction as viewed in FIG. 5 or the front-to-back direction as viewed in FIG. 6) of the input shaft 101a and the transmission shaft 138, this displacement can be absorbed without any unreasonable force being applied to each constituent member.

Also, thrust ball bearings 148 and thrust bearings 149 such as slide bearings or needle bearings are provided between the outer sides of the first and second power rollers 145 and 146 and the inner sides of the intermediate portions of the first and second trunnions 131 and 132. The thrust ball bearings 148 support loads in the thrust direction applied to the first and second power rollers 145 and 146, and yet permit the rotation thereof. Also, the thrust bearings 149 support thrust loads applied from the first and second power rollers 145 and 146 to the outer races 150 of the thrust ball bearings 148, and yet permit the pivot shaft portions 143 and the outer races 150 to oscillate about the support shaft portions 142.

Further, driving rods 151 are coupled to one end portion (the lower end portion as viewed in FIG. 6) of the first and second trunnions 131 and 132, and driving pistons 152 are secured to the outer peripheral surfaces of the intermediate portions thereof. These driving pistons 152 are oil-tightly fitted in driving cylinders 153. These driving pistons 152 and driving cylinders 153 together constitute an actuator for displacing the first and second trunnions 131 and 132 axially of the first and second pivot shafts 133 and 134. Also, pressurized oil can be supplied into and discharged from the driving cylinders 153 on the basis of the changeover of a control value (not shown).

Further, a pressing device 110 of the loading cam type is provided between the input shaft 101a and the first input side disc 116. This pressing device 110 is comprised of a cam plate 111 spline-engaged with the intermediate portion of the input shaft 101a and also supported against axial displacement and rotatable with the input shaft 101a, and a roller 113. The pressing device 110 presses the first input side disc 116 toward the second input side disc 117 on the basis of the rotation of the input shaft 101a and yet rotates it.

During the operation of the above-described double cavity toroidal type continuously variable transmission, the rotation of the input shaft 101a is transmitted to the first input side disc 116 through the pressing device 110, and the second input side disc 117 is rotated in synchronism therewith. The rotation of these first and second input side discs 116 and 117 is transmitted to the first and second output side discs 119 and 120 through the first and second power rollers 145 and 146 in the first and second cavities 129 and 130, and the rotation thereof is taken out from the output gear 122.

When the rotational speed ratio between the input shaft 101a and the output gear 122 is to be changed, the pairs of driving pistons 152 provided correspondingly to the first and second cavities 129 and 130 are displaced by the same distance in opposite directions in each of the cavities 129 and 130 on the basis of the changeover of the control value.

Along with the displacement of these driving pistons 152, two pairs of (four in total) trunnions 133 and 134 are displaced in opposite directions (the right first and second power rollers 145 and 146 as viewed in FIG. 6 downwardly and the left first and second power rollers 145 and 146 upwardly). As the result, the direction of a tangential force acting on the portions of contact between the peripheral surfaces 109a of the first and second power rollers 145 and 146 and the inner sides 102a and 104a of the first and second input side discs 116 and 117 and the first and second output side discs 119 and 120 changes and along therewith, the first and second trunnions 131 and 132 oscillate in opposite directions about the first and second pivot shafts 133 and 134 pivotally supported on the yokes 125a and 125b. As the result, the positions of contact between the peripheral surfaces 109a and 109b of the first and second power rollers 145 and 146 and the inner sides 102a and 104a of the discs 116, 117, 119 and 120 change, and the rotational speed ratio between the input shaft 101a and the output gear 122 changes.

In the case of the prior-art structure shown in FIGS. 5 to 8, however, the work of supporting the pair of yokes 125a and 125b inside the casing 105 and supporting the first and second trunnions 131 and 132 on these yokes has been cumbersome, and this has been the cause of the increased manufacturing cost of the double cavity toroidal type continuously variable transmission.

Firstly, the yokes 125a and 125b are supported relative to the casing 105 by the two support posts 128a and 128b, respectively. Therefore, not only the manufacturing cost of these support posts 128a and 128b is increased, but also the work of mounting these support posts 128a and 128b with respect to the casing 105 and the work of supporting the yokes 125a and 125b relative to these support posts 128a and 128b has become cumbersome.

Secondly, the support holes 126 formed at the four corners of the yokes 125a and 125b are mere circular holes, and the outer races 136 of the radial needle bearings 135 supporting the first and second trunnions 131 and 132 have been fitted in the support holes 126 without any backlash. Therefore, the work of fitting the outer races 136 into the support holes 126 and supporting the first and second trunnions 131 and 132 relative to the yokes 125a and 125b is cumbersome, and it is difficult to enhance the efficiency of the assembling work for the continuously variable transmission.

Thirdly, during the operation of the continuously variable transmission, the inner peripheral surfaces of the support holes 126 and the outer peripheral surfaces of the outer races 136 may slide over the entire periphery and therefore, it is necessary to finish (polish) the inner peripheral surfaces of the support holes 126 over the entire periphery, and the work is cumbersome and the cost increases.

The structure of the double cavity toroidal type continuously variable transmission in which four trunnions are supported by a pair of yokes is described not only in the aforementioned Japanese Patent Publication No. 8-23386, but also in Japanese Laid-Open Patent Application No. 2-283949, Japanese Laid-Open Patent Application No. 5-126222 and Japanese Laid-Open Patent Application No. 6-34010. However, any of these suffers from a similar problem, or the support by the yokes is unstable and during the transition of speed change, the state of contact between the inner sides 102a and 104a of the discs and the peripheral surfaces 109a of the power rollers may become unstable.

SUMMARY OF THE INVENTION

Accordingly, it is an object of the present invention to prevent, in a continuously variable transmission such as a single cavity toroidal type continuously variable transmission, a difference in the contact pressure of the portion of contact (traction portion) between power rollers and an input disc and between power rollers and an output disc and to improve the durability of the traction portion.

It is also an object of the present invention to improve the durability of a traction portion in a continuously variable transmission such as a double cavity toroidal type continuously variable transmission.

It is also an object of the present invention to provide a yoke suitable for use in the above-described continuously variable transmissions and a unit comprising the yoke and a supporting portion.

For these objects, the present invention adopts various constructions as described in the appended claims.

However, the present invention should not be restricted to these embodiments, the but of course, chamber and improvements therein are possible within a scope which does not spoil the gist thereof.

BRIEF DESCRIPTION OF THE DRAWINGS

FIG. 8 is a plan view of a yoke in FIGS. 5 and 6.

FIG. 9 is a plan view showing a yoke and a support post according to an embodiment of the present invention.

FIG. 10 is a cross-sectional view taken along the line X—X of FIG. 9.

FIGS. 27A, 27B, 27C and 27D are plan views of yokes according to tenth to thirteenth embodiments of the present invention.

DESCRIPTION OF THE PREFERRED EMBODIMENTS

Figure 1:
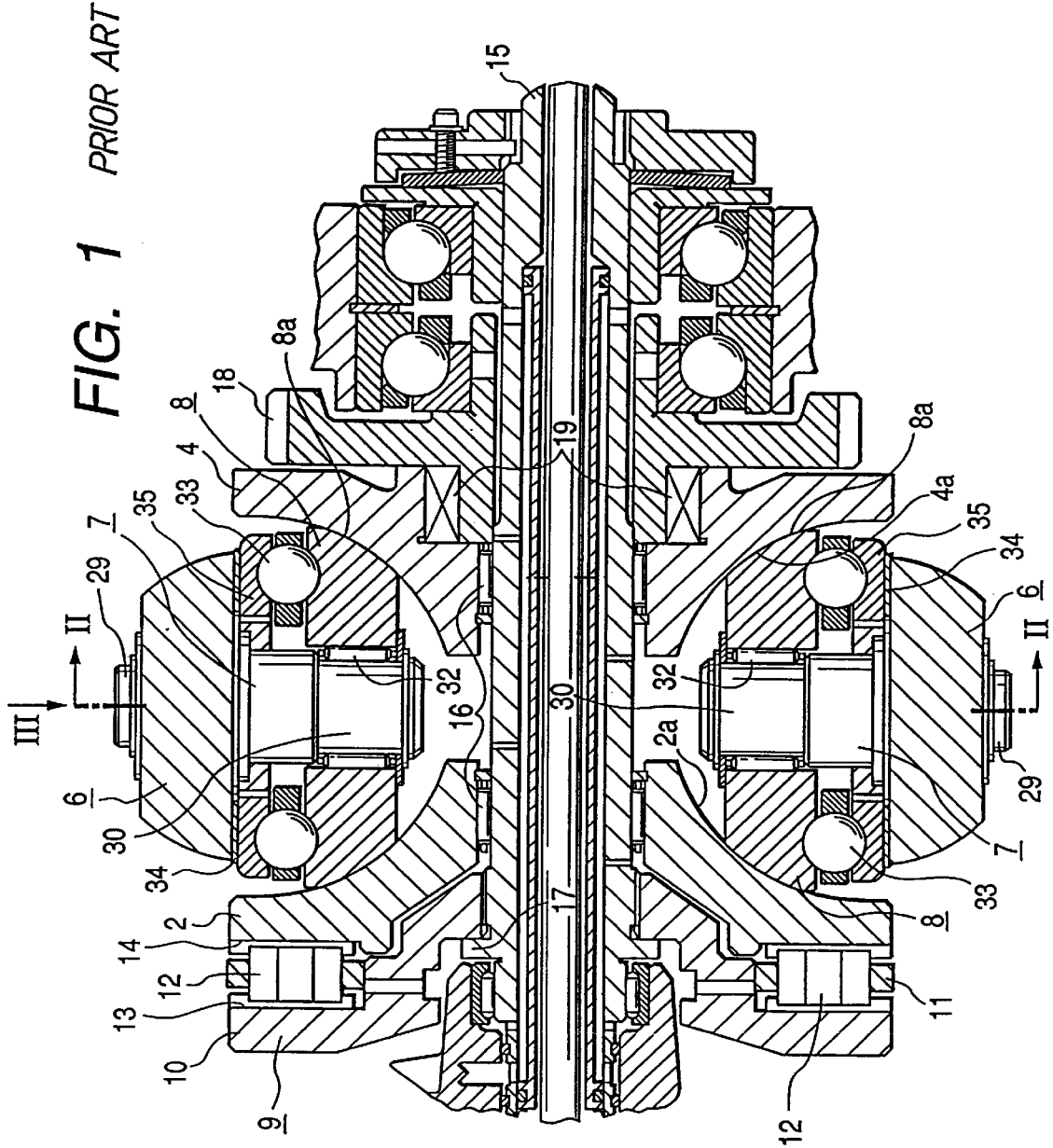
FIG. 1 is a cross-sectional view showing an example of the prior art.

FIGS. 9 to 13 show a first embodiment of the present invention. This is an embodiment in which the present invention is applied to a single cavity toroidal type continuously variable transmission. The feature of this toroidal type continuously variable transmission resides in such structure that a yoke 220 for supporting a pair of trunnions 6 inside a casing 22 (FIGS. 1 and 2) for displacement and oscillation is supported on the inner surface of the casing 22. In the other points, the structure and action of the present embodiment are similar to those of the aforedescribed prior art and therefore, the showing and description of equivalent portions will be omitted or simplified, and chiefly the characteristic portions of the present invention will hereinafter be described.

Figure 2:
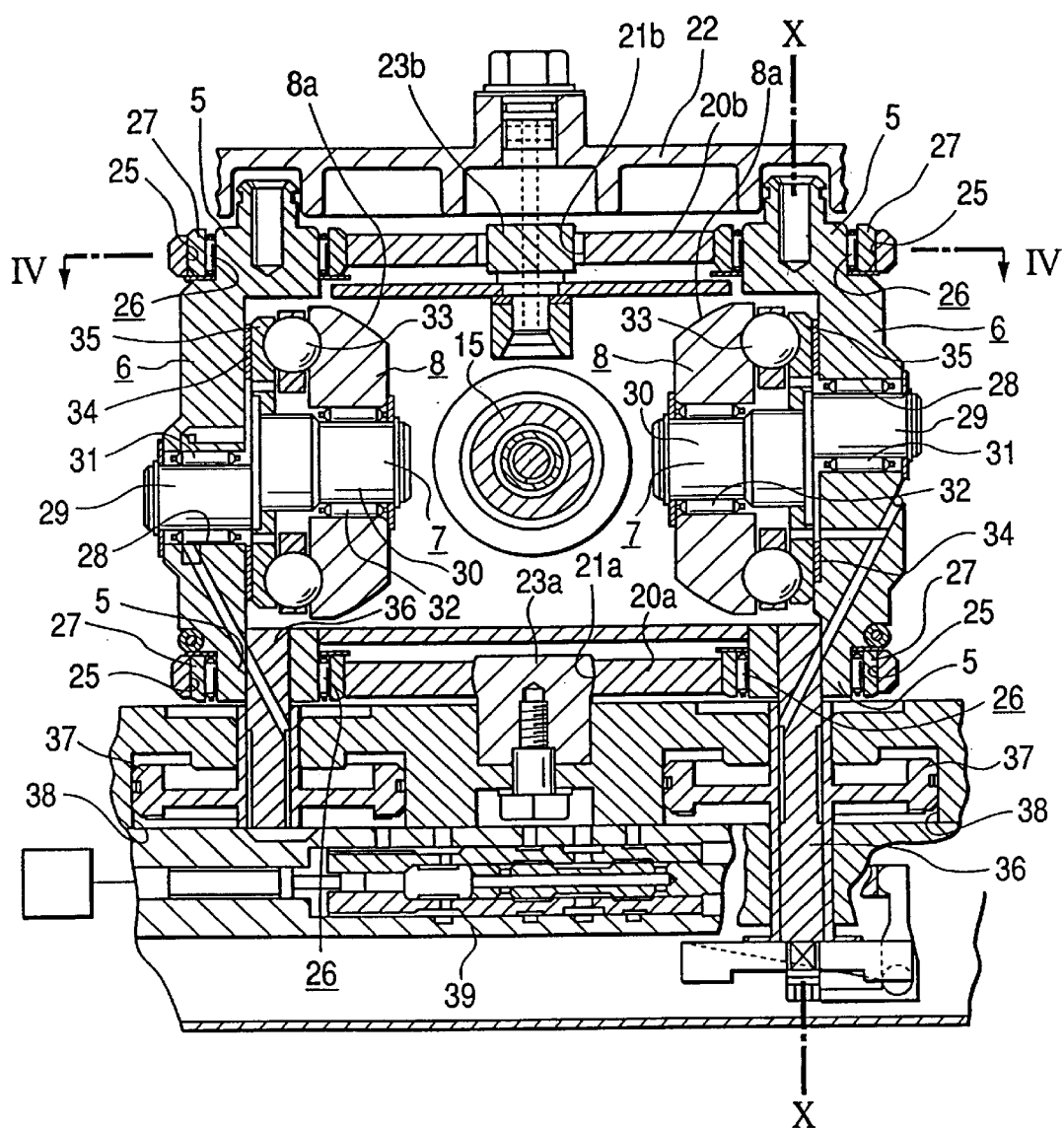
FIG. 2 is a cross-sectional view taken along the line II—II of FIG. 1.
Figure 3:
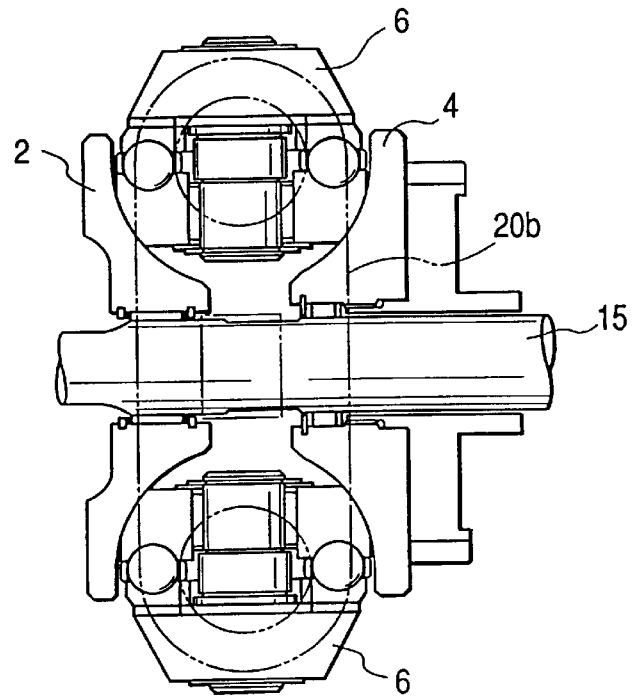
FIG. 3 is a partial plan view of FIGS. 1.
Figure 4:
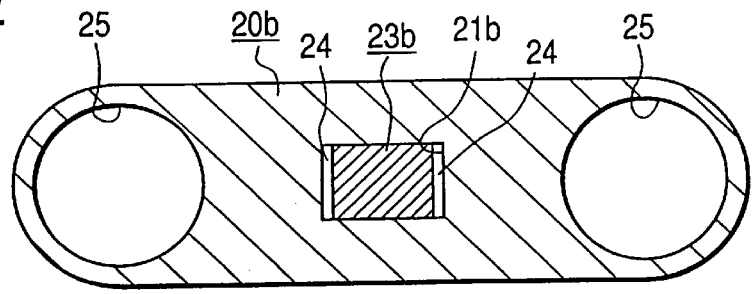
FIG. 4 is a cross-sectional view taken along the line IV—IV of FIG. 2 and showing a yoke and a support post.

Of a pair of yokes 220a and 220b constituting a single cavity toroidal type continuously variable transmission provided with an input disc and an output disc, one yoke 220b is (i) supported against movement relative to a support post 223b in the axial direction of the input side and output side discs 2 and 4 (a vertical direction as viewed in FIG. 9 or the front-to-back direction as viewed in FIGS. 2 and 10) and against movement in the axial direction (the horizontal direction as viewed in FIGS. 2 and 10) in the neutral state of a pair of power rollers 8, (ii) supported for oscillatory displacement in a second imaginary plane (a plane containing the line X—X of FIG. 9 and perpendicular to the plane of the drawing sheet, or a plane on the plane of the drawing sheet of FIG.(9) perpendicular to an imaginary plane containing the center axis of the support post 223b and the center axis of the two discs 2 and 4, and (iii) supported for movement in the axial direction of pivot shafts 5 (the front-to-back direction as viewed in FIG. 9 or the vertical direction as viewed in FIGS. 2 and 10).

That is, the yokes are supported against movement in a lengthwise direction and a direction perpendicular thereto relative to the supporting portion of the casing and the pivot shafts of the trunnions and for oscillation in a plane extending in the direction of the plate thickness thereof, and at least one of the yokes is supported for movement in the direction of the plate thickness thereof.

For this purpose, in the shown embodiment, a restraining hole 221 formed in the central portion of the yoke 220b is made square or rectangular. Correspondingly thereto, the plane shape of a fitting piece 241 fixed to the tip end of the support post 223b is made into a square or a rectangle capable of being fitted in the restraining hole 221 without any backlash and also, two of four surfaces constituting the outer peripheral surface of a fitting portion 240 which are present on the opposite side are made into convex curved surfaces 242 each comprising a portion of a cylindrical surface. With the fitting portion 240 which is constituted by such a fitting piece 241 being fitted in the restraining hole 221, these convex curved surfaces 242 are brought into contact with the two surfaces of the restraining hole 221 which are opposed thereto.

In contrast, the other yoke 220a (not shown) is similar to the lower yoke 20a of FIG. 2.

In the case of the toroidal type continuously variable transmission of the present invention constructed as described above, the pair of yokes 220a and 220b are both supported against movement in the axial direction of the input side and output side discs 2 and 4 and movement in the axial direction of the power rollers 8 and therefore, the contact pressures of the portions of contact, i.e., the traction portions (see FIG. 1) between the peripheral surfaces of the pair of power rollers 8 and the inner sides 2a and 4a of the input side and output side discs 2 and 4 can be made identical with each other. That is, neither of the pair of yokes 220a and 220b is displaced in the axial direction of the power rollers 8 with the speed changing work or the like and therefore, it never happens that the states of contact of the portions of contact become non-uniform. Therefore, the stability of speed change synchronism regarding the pair of power rollers 8 can be secured and a great force can be prevented from being applied to one of the traction portions to thereby improve the durability of each constituent members including the power rollers 8 and the two discs 2 and 4. Moreover, at least one of the yokes 220b and 220a is fitted and supported on the support post 223b or 223a for movement in the axial direction of the pivot shafts 5 and therefore, during the speed changing operation, the displacement of the driving pistons 37 (see FIG. 2) in the driving cylinders 38 can be effected smoothly.

The radius of curvature R of the cross-sections of the convex curved surfaces 242 of the fitting portion 240 is determined in the relation thereof with the length L of the restraining hole 221, and may preferably be a half or less of the length L ($R \leq L/2$) so that the speed changing operation may be performed smoothly. Most preferably, it may be $R = L/2$ and the both convex curved surfaces 242 are located on a single cylindrical surface. Here, it is effected by only the yoke 220b on the side on which the driving pistons 37 and driving cylinders 38 are installed to support the yokes for oscillation in a predetermined direction and displacement only in the axial direction of the pivot shaft relative to the support post, but it may also be carried out with respect to the yoke 220a on the opposite side, or may be carried out with respect to both yokes.

Figure 14:
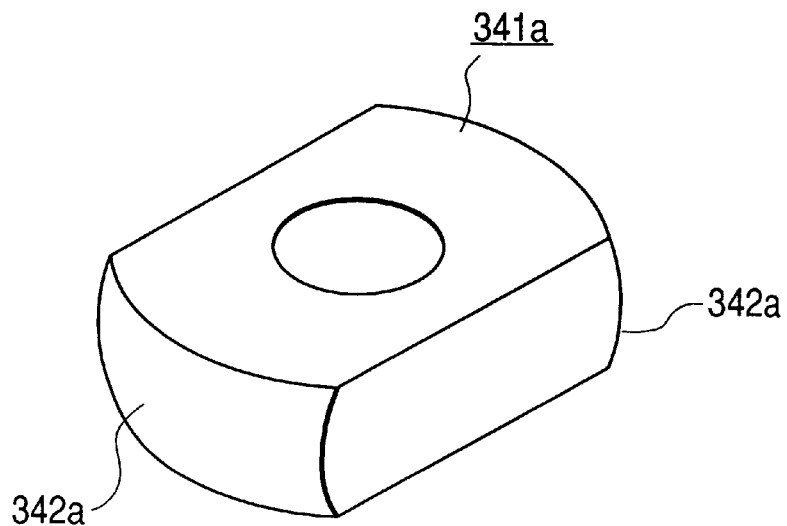
FIG. 14 is a perspective view of a fitting piece constituting the fitting portion of the tip end of a support post, showing a second embodiment of the present invention.
Figure 15:
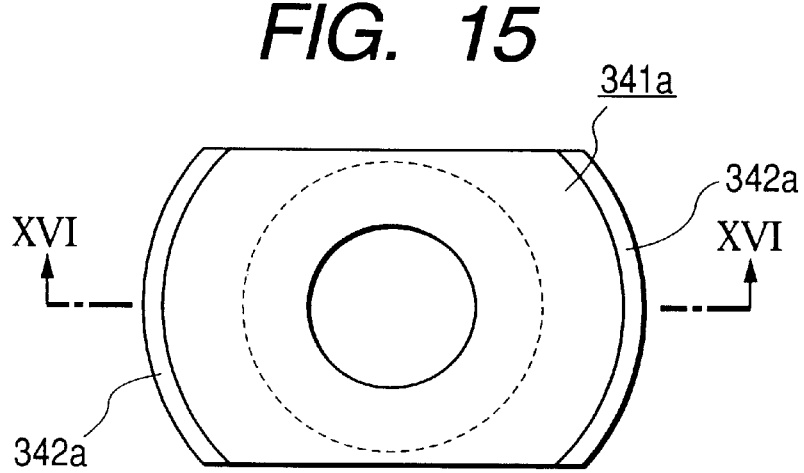
FIG. 15 is a plan view of the fitting piece of FIG. 14.
Figure 16:
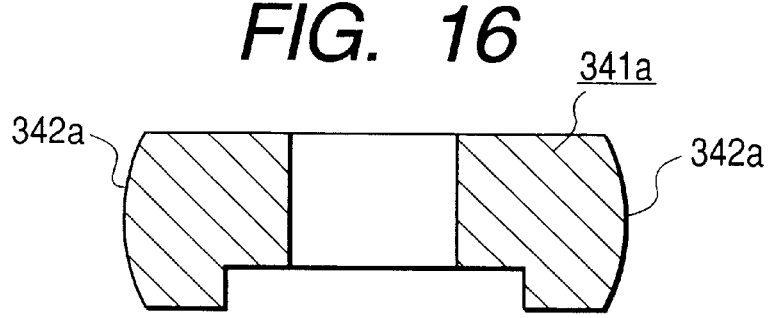
FIG. 16 is a cross-sectional view taken along the line XVI—XVI of FIG. 15.

FIGS. 14 to 16 show a second embodiment of the present invention. In the case of the present embodiment, the plane shape of a fitting piece 341a for constituting the fitting portion 240 (FIGS. 9 and 10) at the tip end portion of the support post 223 is made oval and convex curved surfaces 342a bearing against the inner side of the restraining hole 221 (FIGS. 9 and 10) for oscillatory displacement are curved not only in the cross-sectional shape thereof but also in the plane shape thereof. In the other points, the construction and action of the present embodiment are similar to those of the above-described first embodiment. Such a fitting piece 341a is easy to work, as compared with the fitting piece 241 incorporated in the above-described first embodiment.

Figure 17:
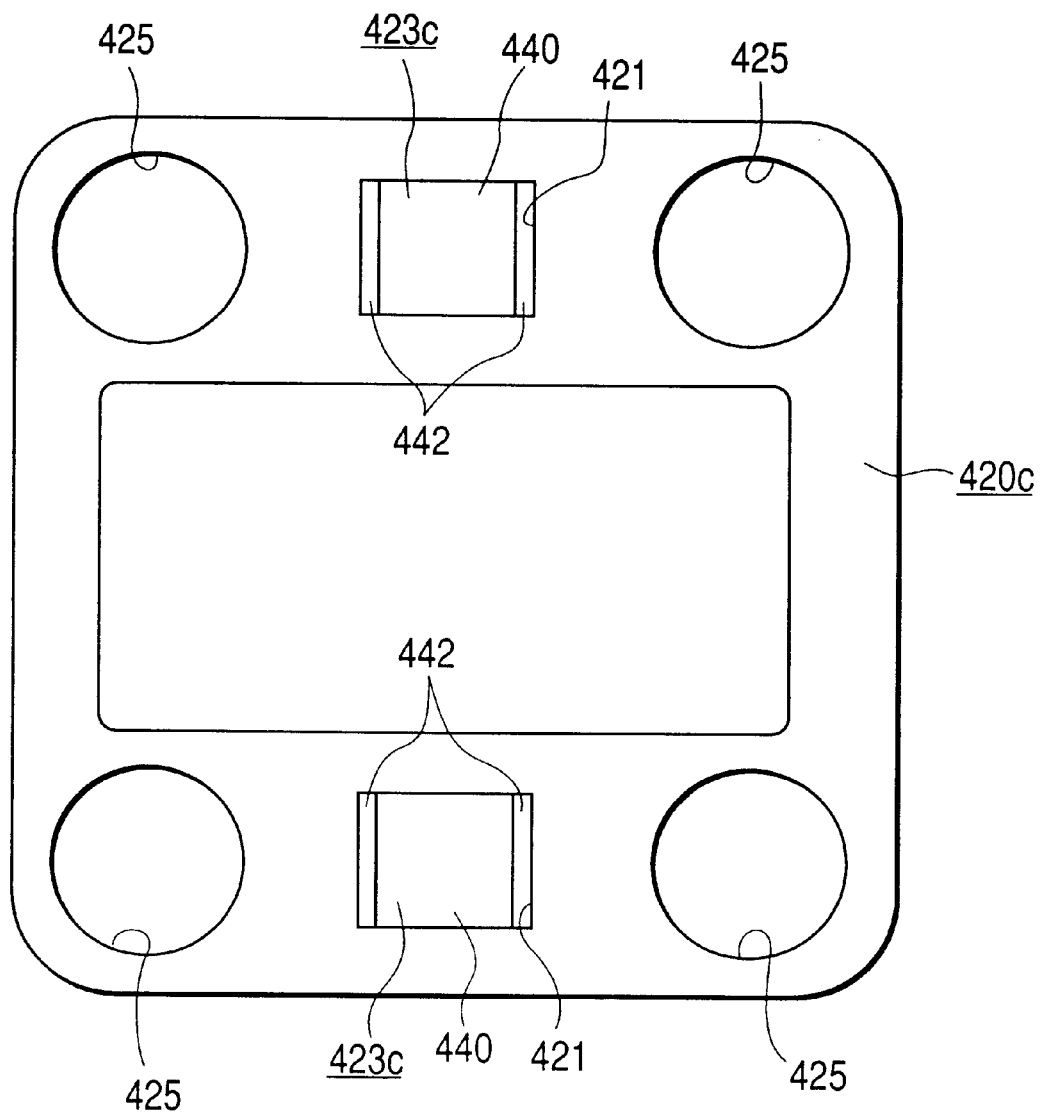
FIG. 17 is a plan view showing a yoke and a support post according to a third embodiment of the present invention.

FIG. 17 shows a third embodiment of the present invention. It shows a case where the present invention is embodied in a so-called double cavity toroidal type continuously variable transmission in which two input side discs and two output side discs are provided and sets forming respective pairs are disposed in parallel to each other with respect to the direction of transmission of power.

In the case of this yoke 420c, the hole is formed into a square or a rectangle and circular holes 425 for supporting pivot shafts are formed in the four corner portions thereof. Fitting portions 440 (which may suitably be one shown in FIGS. 11 to 16) secured to the tip end portion of a support post 423c are fitted in two restraining holes 421 formed between adjacent ones of the circular holes 425.

Again in the case of this double cavity toroidal type continuously variable transmission, the stability of speed change synchronism regarding the power rollers can be secured and a great force can be prevented from being applied to one of the traction portions to thereby improve the durability of constituent members including the power rollers and the discs.

Figure 5:
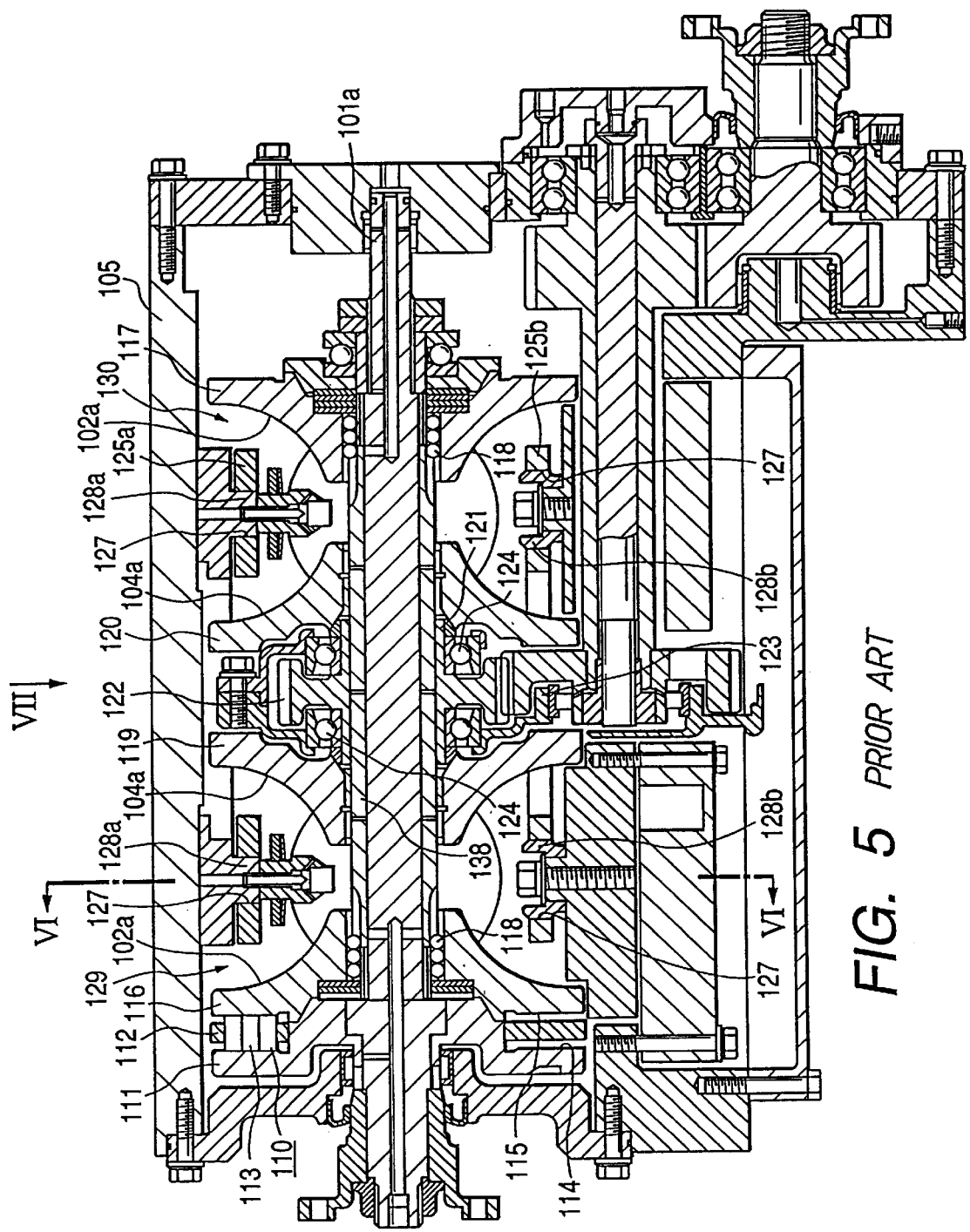
FIG. 5 is a cross-sectional view showing another example of the prior art.

FIGS. 18 to 22 show a fourth embodiment in which the present invention is applied to a double cavity toroidal type continuously variable transmission. The feature of this embodiment resides in the structure for supporting on the inner surface of a casing 505 a pair of yokes 554a and 554b for supporting two pairs of first and second trunnions 131 and 132 (FIG. 6) for displacement and oscillation. In the other points, the structure and action of the present embodiment are similar to those of the prior art shown in FIGS. 5 and 6 and therefore, the showing and description of equivalent portions will be omitted or simplified, and chiefly the characteristic portions of the present embodiment will hereinafter be described.

Each of the pair of yokes 554a and 554b is formed into a rectangular frame-like shape by subjecting a metal plate such as a thick steel plate to punching work or subjecting a metallic material such as steel to forging work, and circular supporting holes 526 are formed in the four corner portions thereof. The inner diameter of each of these supporting holes 526 is of such a size that permits the outer races 136 (FIG. 6) of the radial needle bearings 135 supporting the first and second pivot shafts 133 and 134 (FIG. 6) to be fitted therein for axial displacement without any backlash. Also, in the intermediate portion in the widthwise direction (the vertical direction as viewed in FIG. 18 or the front-to-back direction as viewed in FIG. 22) of one end portion (the left end portion as viewed in FIGS. 18 and 22) of each of the yokes 554a and 554b, a rectangular restraining hole 527a is formed between adjacent ones of the supporting holes 526, and a fitting piece 555 secured to the tip end portion of a support post 528c fixed to the inner surface of the casing 505 is fitted in the restraining hole 527a.

Figure 18:
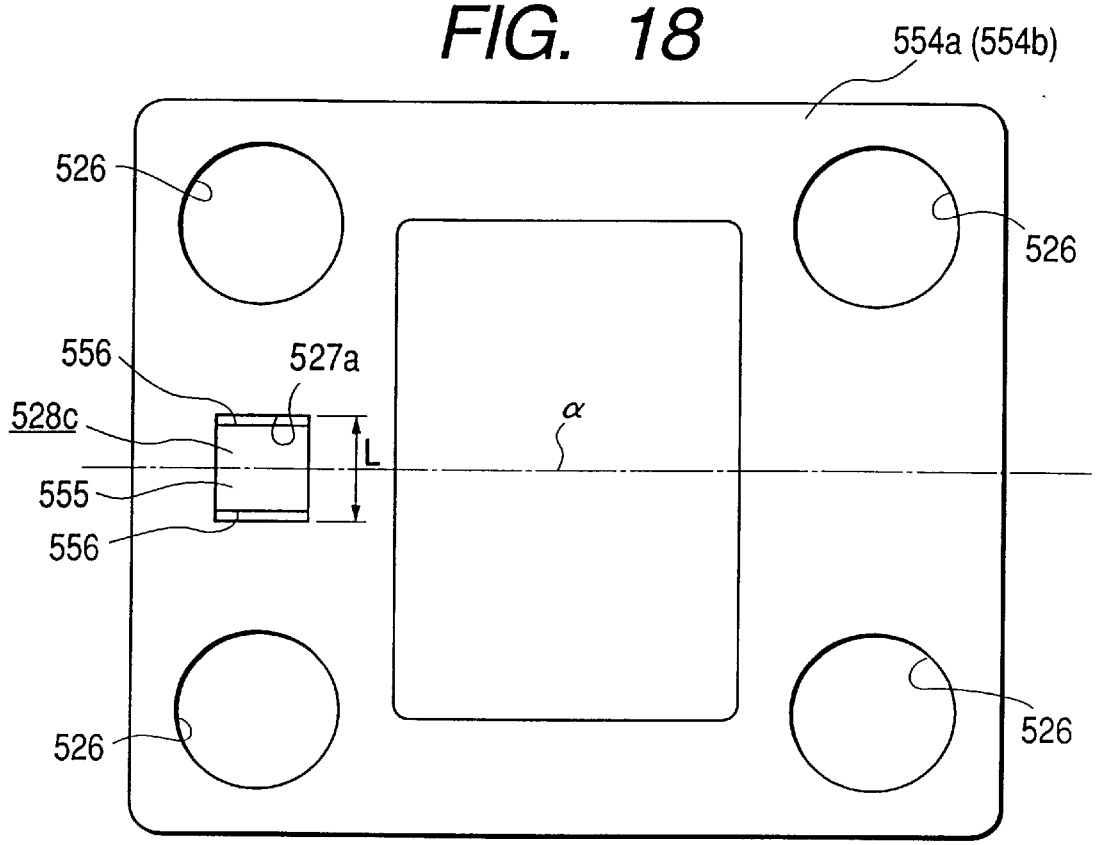
FIG. 18 is a plan view showing a yoke and a support post according to a fourth embodiment of the present invention.
Figure 19:
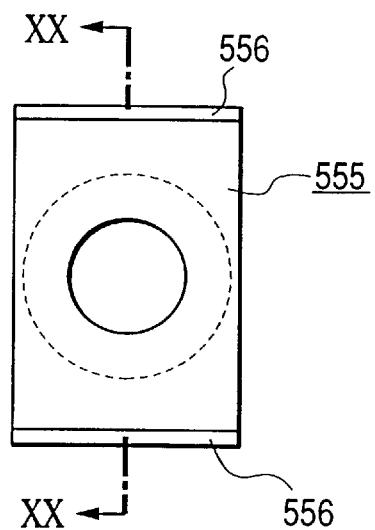
FIG. 19 is a plan view of a fitting piece secured to the support post.
Figure 20:
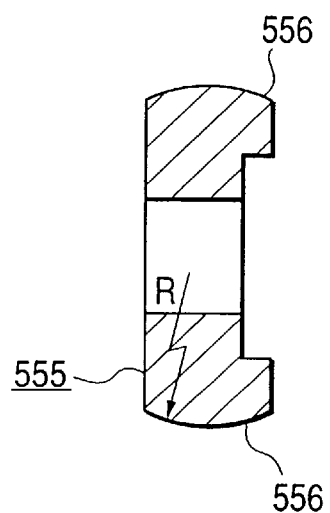
FIG. 20 is a cross-sectional view taken along the line XX—XX of FIG. 19.
Figure 21:
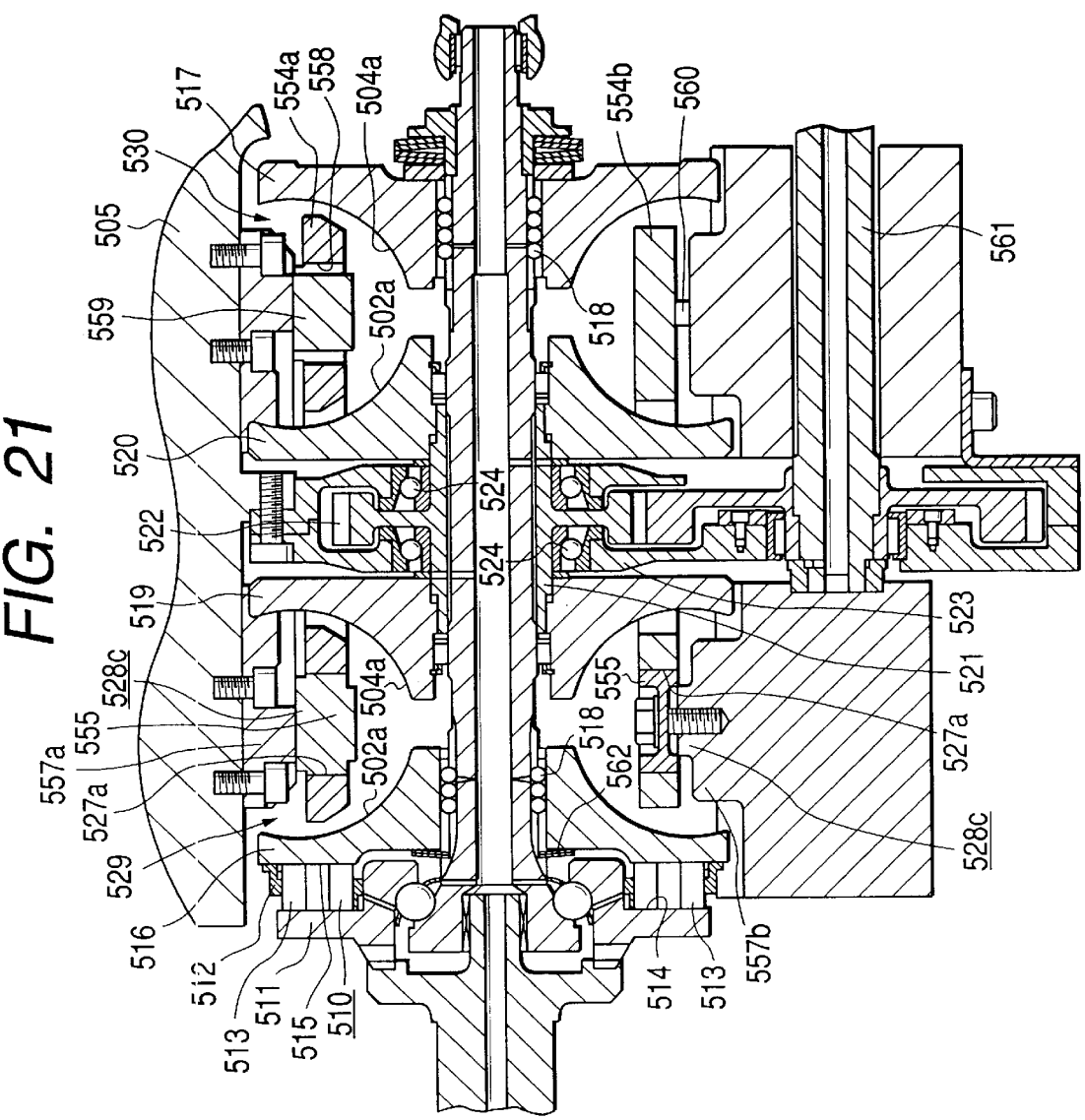
FIG. 21 is a perspective view of the fitting piece.
Figure 22:
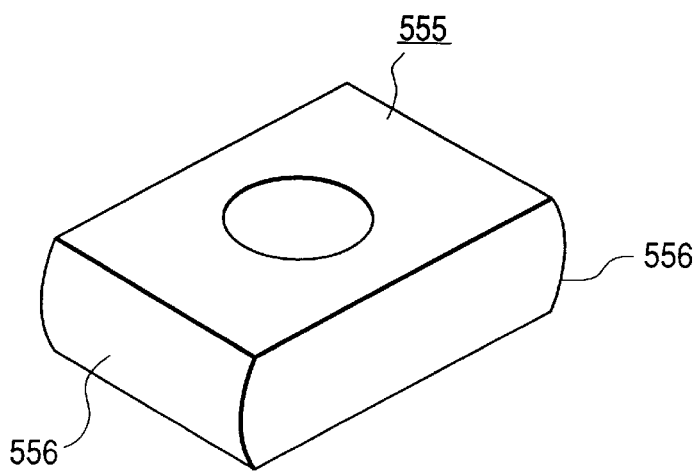
FIG. 22 is a cross-sectional view showing a state in which the yoke and support post are incorporated in a double cavity toroidal type continuously variable transmission.

In the case of the present embodiment, on the basis of the engagement between this fitting piece 555 and the restraining hole 527a, the yokes 554a and 554b are supported against movement on an imaginary plane intersecting perpendicularly with the center axis of the first and second pivot shafts 133 and 134 (FIG. 6) (a plane lying parallel to the plane of the drawing sheet of FIG. 18 and in the front-to-back direction as viewed in FIG. 22) and for oscillatory displacement about an imaginary center axis (dot-and-dash line α in FIG. 18) parallel to the center axes of the first and second input side discs 116 and 117 and the first and second output side discs 119 and 120, and further for movement relative to the support post 528c in the axial direction of the first and second pivot shafts 133 and 134 (the front-to-back direction as viewed in FIGS. 18 and 19, the horizontal direction as viewed in FIG. 20 or the vertical direction as viewed in FIG. 22).

Therefore, in the illustrated embodiment, as described above, the restraining hole 527a of the yoke 554a is made into a square or a rectangle and also, the plane shape of the fitting piece 555 is made into a square or a rectangle capable of being fitted in the restraining hole 527a without any backlash. Also, two of four surfaces constituting the outer peripheral surface of the fitting piece 555 which are present on opposite sides are made into convex curved surfaces 56 each comprising a portion of a cylindrical surface. That is, the support post 528c brings the convex curved surfaces 556 into contact with the two inner peripheral surfaces of the restraining hole 527a which are on the widthwisely opposite sides of the yoke 554a in a state in which the fitting piece 555 having the convex curved surfaces 56 of the square or rectangular plane shape and partial cylindrical shape as shown in FIGS. 18 to 22 is coupled and fixed to a supporting portion 557a projectedly provided on the inner surface of the housing 505 and the fitting piece 555 is fitted in the restraining hole 527a.

The radius of curvature R of the cross-section of the cylindrical convex curved surfaces 556 constituting two surfaces existing on the opposite side of the outer peripheral surface of the fitting piece 555 is determined in the relation thereof with the length L of the restraining hole 527a, and may preferably be a half or less of the length L (R≦L/2) so that the speed changing operation may be performed smoothly. Most preferably, it may be R=L/2, and the two convex curved surfaces 556 are located on a single cylindrical surface.

The above-described circumstances also hold true of the other yoke 554b.

The pair of yokes 554a and 554b are constructed as described above and therefore, by the curtailment of the number of parts and the number of assembling steps, a reduction in the cost of the double cavity toroidal type continuously variable transmission can be achieved.

Also, the range within which the yokes 554a and 554b can be displaced relative to the support posts 528c is regulated to thereby contrive the positioning of two pairs of first and second trunnions 531 and 532 provided in the first and second cavities 529 and 530. Accordingly, the contact pressures of the portions of contact, i.e., the traction portions, between the peripheral surfaces 109a of the first and second power rollers 145 and 146 supported on the inner sides of the trunnions 531 and 532 and the inner sides 502a and 504a of the first and second input side discs 516 and 517 and the first and second output side discs 519 and 520 can be kept equal to each other. That is, neither of the pairs of yokes 554a and 554b is displaced axially of the first and second power rollers 545 and 546 with the speed changing work or the like and therefore, it never happens that the state of contact of the portions of contact becomes non-uniform on the basis of the displacement of the yokes 554a and 554b. Therefore, the stability of speed change synchronism regarding the pair of first and second power rollers 545 and 546 is secured and also, a great force is prevented from being applied to one of the traction portions, whereby the durability of constituent members including the first and second power rollers 545 and 546 and the discs 516, 517, 519 and 520 can be improved.

Support posts for supporting the pair of yokes 554a and 554b relative to the inner surface of the housing 505 are not provided on the other end portions of the pair of yokes 554a and 554b. That is, a through-hole 558 (not shown in FIG. 18) is formed in the widthwisely central portion of the other end portion of the upper yoke 554a, and a nozzle member 559 for feeding traction oil into the second cavity 530 is loosely inserted therein. In contrast, the other end portion of the lower yoke 554b is resiliently supported relative to the inner surface of the housing 505 by a spring 560.

While in FIG. 18, the support posts 528c for supporting the pair of yokes 554a and 554b on the inner surface of the housing 505 are provided on the front side (the engine side), they may be provided on the rear side (the differential gear side). (However, near the second cavity 530 on the rear side, there is present a taking-out shaft 561 for taking out the rotation of the output gear 522 toward the differential gear and therefore, regarding the lower yoke 554b, it is difficult to provide a support post on the rear side.

Figure 23:
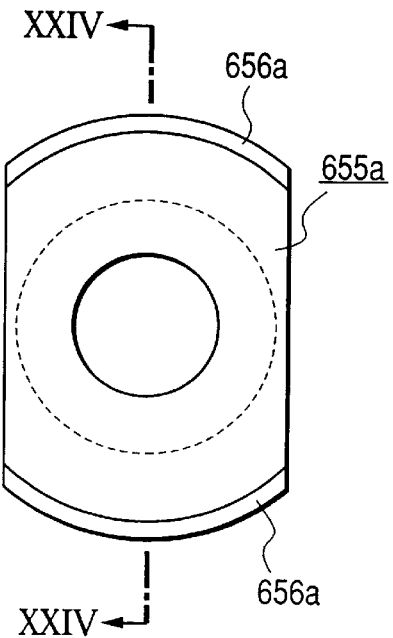
FIG. 23 is a plan view of a fitting piece secured to a support post according to a fifth embodiment of the present invention.
Figure 24:
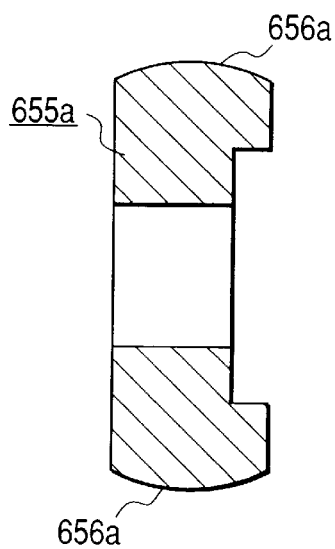
FIG. 24 is a cross-sectional view taken along the line XXIV—XXIV of FIG. 23.
Figure 25:
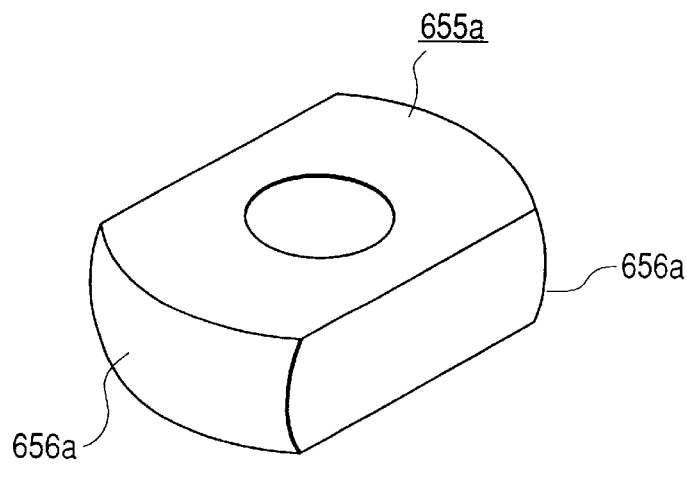
FIG. 25 is a perspective view of the fitting piece.

Next, in the case of the fifth embodiment of FIGS. 23 to 25, the plane shape of a fitting piece 655a secured to the tip end portion of the support post is made oval, and convex curved surfaces 656a bearing against the inner side of a restraining hole 627a for oscillatory displacement are curved not only in the cross-sectional shape thereof but also in the plane shape thereof. In the other points, the construction and action of the present embodiment are similar to those of the above-described first embodiment. Such a fitting piece 655a is easy to work, as compared with the fitting piece 55 incorporated in the above-described first embodiment.

Figure 26A:
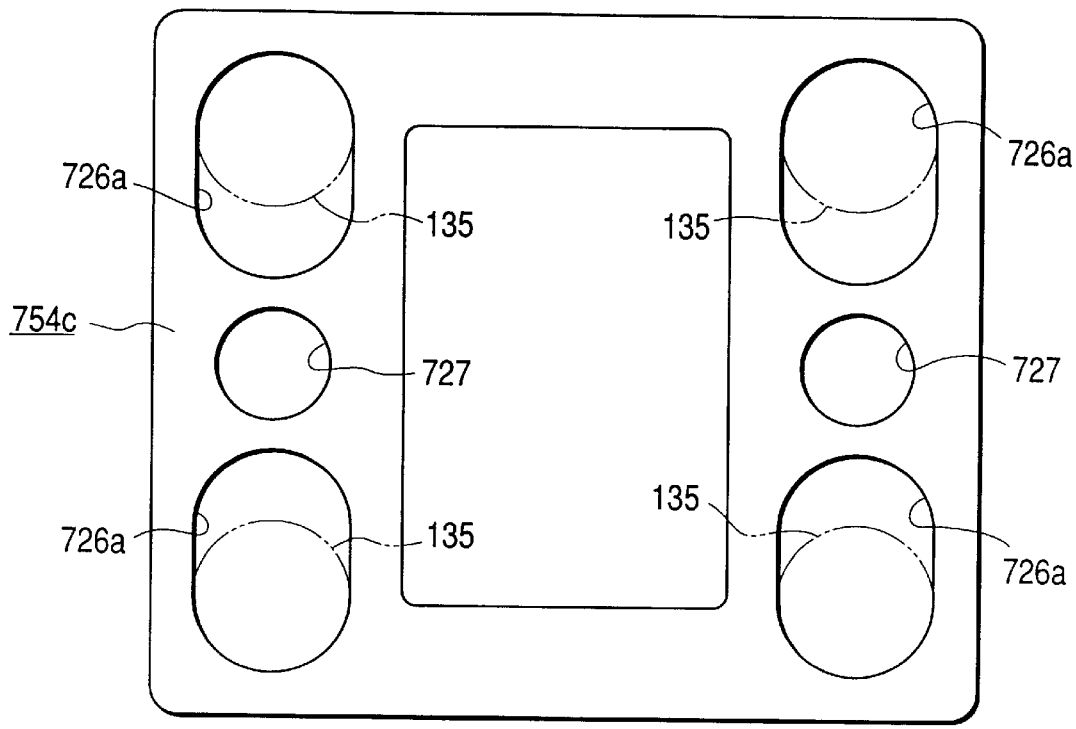
FIGS. 26A, 26B, 26C and 26D are plan views of yokes according to sixth to ninth embodiments of the present invention.

Next, in the case of the sixth embodiment of FIG. 26A, support holes 726a formed in the four corner portions of a pair of yokes 754c for supporting the first and second pivot shafts 133 and 134 (FIG. 6) for oscillation are slots. That is, each of these support holes 726a has a width substantially coincident with the outer diameter of the outer races 136 (FIG. 6) of the radial needle bearings 135 for supporting the first and second pivot shafts 133 and 134, and a length greater than this outer diameter. The lengthwise direction of these support holes 726a is made incident with a direction perpendicular to the direction of the center axis of the first and second input side discs 516 and 517 and the first and second output side discs 519 and 520.

In the case of the double cavity toroidal type continuously variable transmission having the yoke 754c incorporated therein as described above, the degree of freedom with which the first and second pivot shafts 133 and 134 and the radial needle bearings 135 are inserted and supported in the supporting holes 726a is high. That is, the length of the supporting holes 726a is sufficiently greater than the outer diameter of the outer race 136 and therefore, the range within which the two are opposed to each other is wide. Therefore, it is easy to insert and support the first and second pivot shafts 133 and 134 and the radial needle bearings 135 into the supporting holes 726a and thus, the work of assembling the continuously variable transmission can be made efficient.

Figure 6:
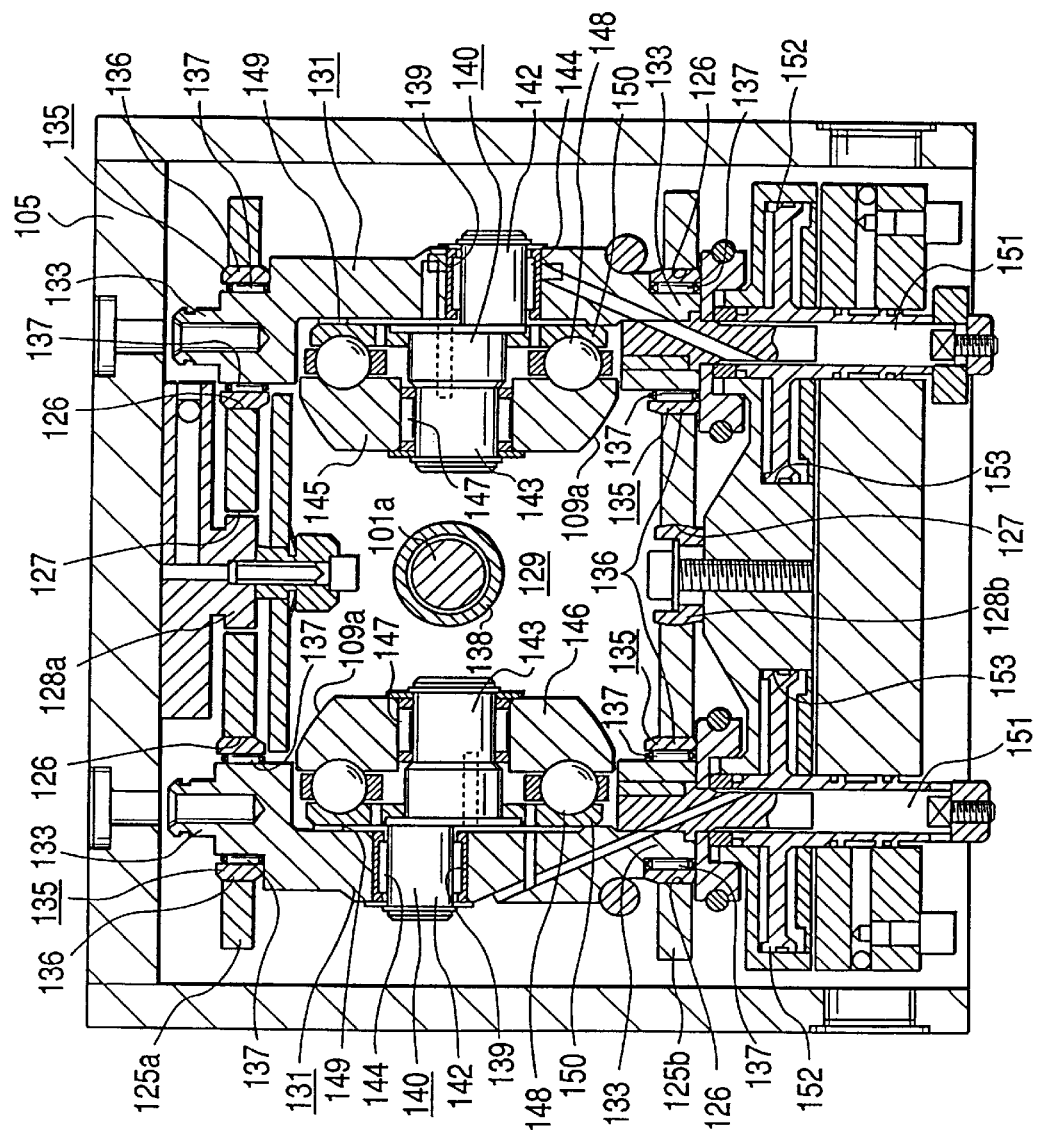
FIG. 6 is a cross-sectional view taken along the line VI—VI of FIG. 5.
Figure 11:
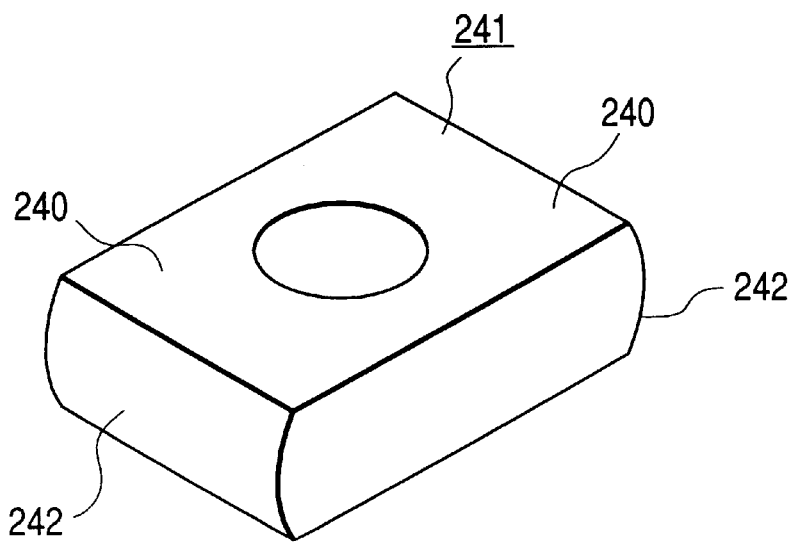
FIG. 11 is a perspective view of a fitting piece constituting the fitting portion of the tip end of a support post.
Figure 12:
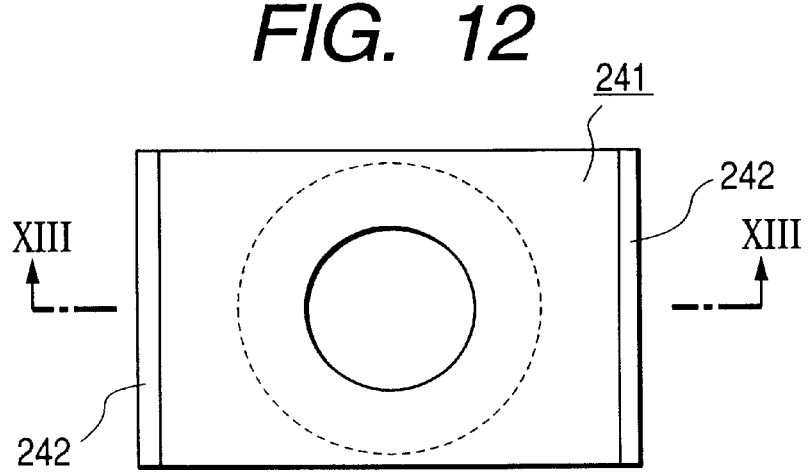
FIG. 12 is a plan view of the fitting piece of FIG. 11.
Figure 13:
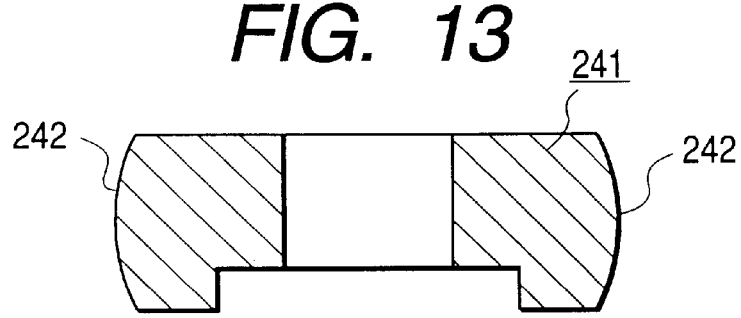
FIG. 13 is a cross-sectional view taken along the line XIII—XIII of FIG. 12.

Also, in a state in which the toroidal type continuously variable transmission has been assembled and a pre-load is applied to the portions of contact between the inner sides 502a and 504a of the first and second input side discs 516 and 517 and the first and second output side discs 519 and 520 and the peripheral surfaces 509a of the first and second power rollers 545 and 546 by a belleville spring 562 (FIG. 22), the first and second pivot shafts 133 and 134 and the radial needle bearings 135 are moved inside the supporting holes 726a to the widthwisely outer end portions (the upper and lower end portions as viewed in FIG. 26A) of the yoke 754c, as shown in FIG. 26A, by a thrust load applied from the power rollers 545 and 546 to the inner sides of the first and second trunnions 131 and 132 (FIG. 6). When during the operation of the continuously variable transmission, a greater thrust load is applied by a pressing device 510, the first and second pivot shafts 133 and 134 and the radial needle bearings 135 remain urged to their positions shown in FIG. 26A.

Accordingly, during the operation of the continuously variable transmission, the outer peripheral surfaces of the outer races 136 slide on the widthwisely outer end portion of the yoke 754c, of the inner peripheral surfaces of the supporting holes 726a. Therefore, it will suffice to finish the supporting holes 726a alone, and the working cost of the yoke 754c can be reduced. The work of inserting the first and second pivot shafts 133 and 134 and the radial needle bearings 135 including the outer races 136 into the supporting holes 726a is done before the belleville spring 562 is mounted and therefore, the work of inserting these can be done easily. Circular restraining holes 727 are formed between adjacent ones of the supporting holes 726 at the widthwisely intermediate positions of the opposite end portions of the yoke 754c so that the yoke 754c may be supported in the casing 505 by the use of these restraining holes 727.

Figure 7:
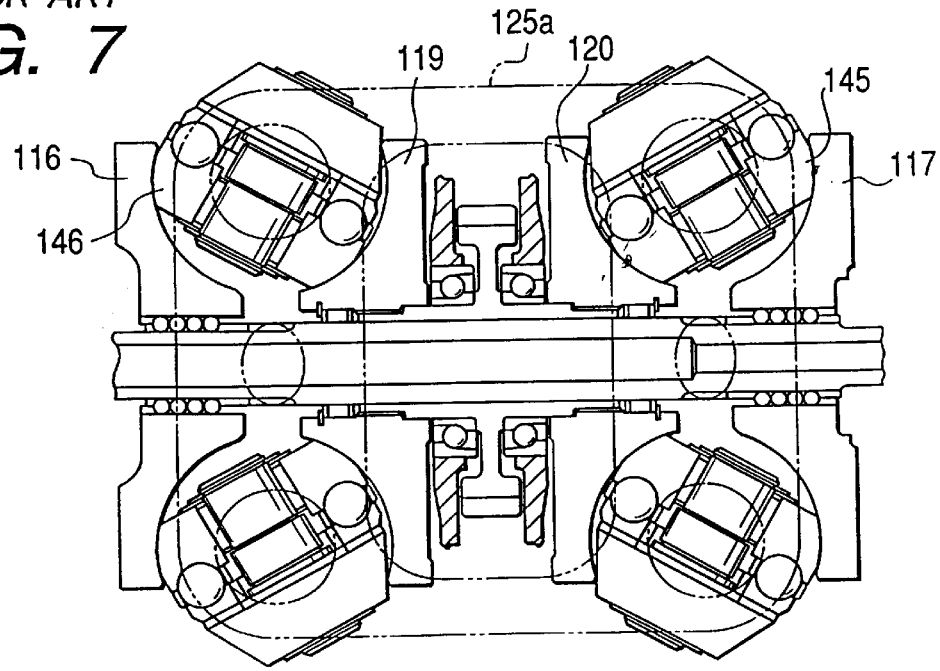
FIG. 7 is a partial plan view of FIG. 5.
Figure 26B:
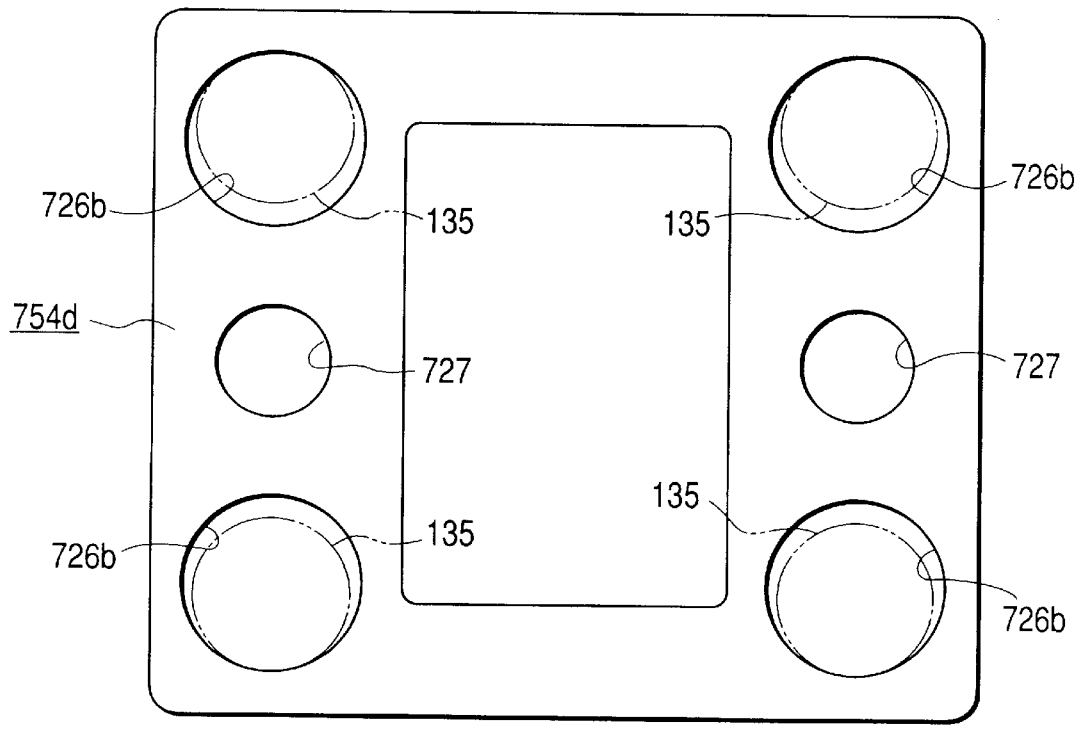

FIG. 26B shows a seventh embodiment, and supporting holes 726b formed in the four corner portions of a pair of yokes 854d for supporting the first and second pivot shafts 133 and 134 (FIG. 6) for oscillation are circular holes. However, the inner diameter of these supporting holes 726b are made sufficiently larger than the outer diameter of the outer race 136 (FIGS. 6 to 8) constituting the radial needle bearing 135 for supporting the first and second pivot shafts 133 and 134, and the outer races 136 are loosely insertable into the supporting holes 726b.

In the case of the yoke 754d in the present embodiment, the work of inserting the first and second pivot shafts 133 and 134 and the radial needle bearings 135 including the outer races 136 into the supporting holes 726b can be done easily and the work of assembling the continuously variable transmission can be made efficient. Also, in a state in which the continuously variable transmission has been assembled and during the operation of the transmission, as in the case of the above-described third embodiment, the first and second pivot shafts 133 and 134 and the radial needle bearings 135 are moved inside the supporting holes 726b to the widthwisely outer end portion of the yoke 754d, as shown in FIG. 26B, on the basis of the resilient force of the belleville spring 562 (FIG. 22), and further remain urged.

Accordingly, during the operation of the continuously variable transmission, the outer peripheral surfaces of the outer races 136 slide on only the widthwisely outer end portion of the yoke 754d, of the inner peripheral surfaces of the supporting holes 726b and therefore, it will suffice to finish this portion alone and thus, the working cost of the yoke 754d can be reduced. By the use of circular restraining holes 727 formed at the widthwisely intermediate positions of the opposite end portions of the yoke 754d, the yoke 754d is supported in the casing 505.

Figure 26C:
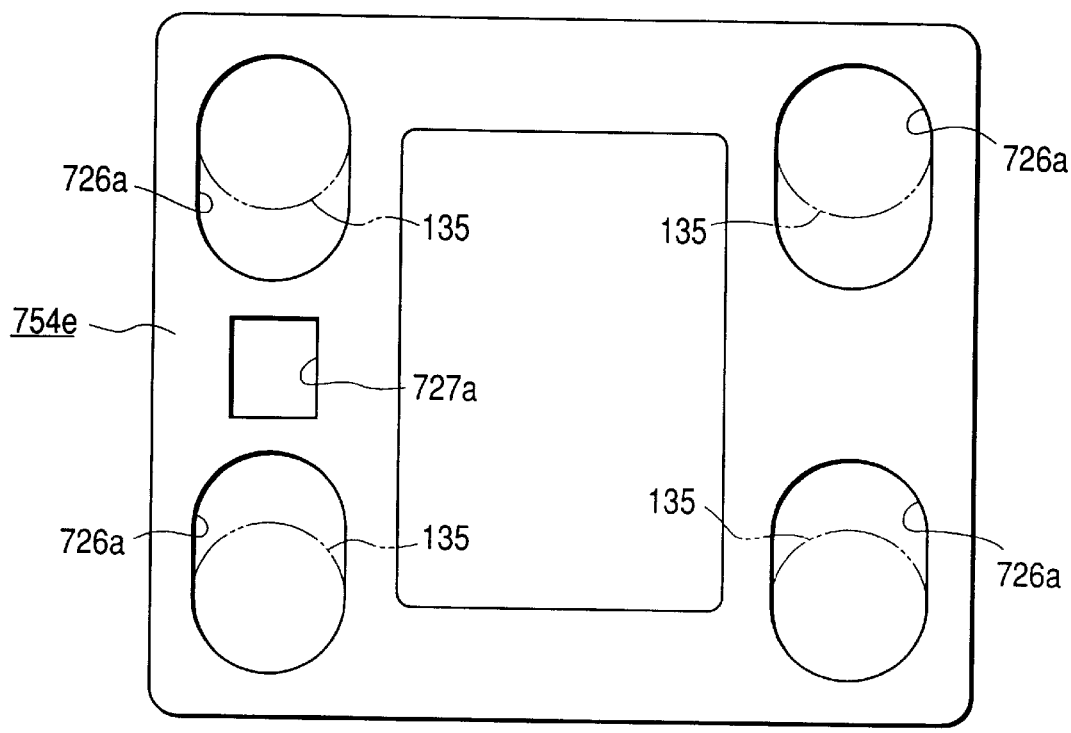

Next, in the case of the eighth embodiment of FIG. 26C, a square or rectangular restraining hole 727a is formed in the widthwisely central portion of one end portion of a yoke 754e and also, supporting holes 726a formed in the four corner portions of the yoke 754e are slots.

According to such structure of the present embodiment, the operation and effect of the aforedescribed first embodiment and the operation and effect of the aforedescribed third embodiment can all be provided.

Figure 26D:
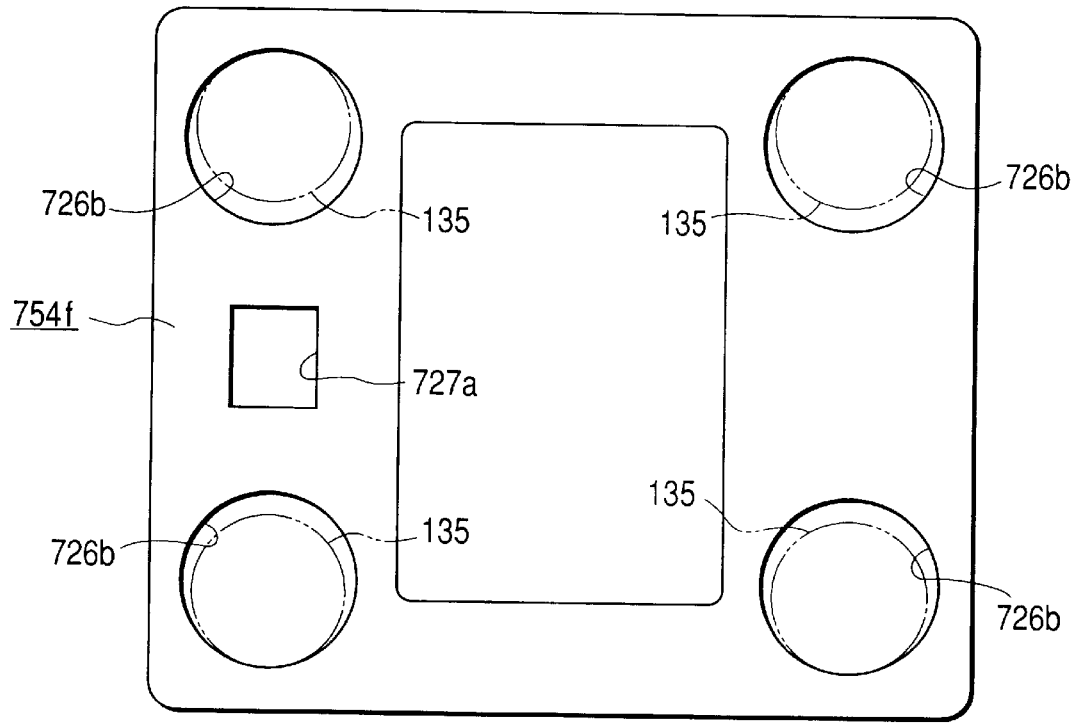

Next, in the case of the ninth embodiment of FIG. 26D, a square or rectangular restraining hole 727a is formed in the widthwisely central portion of one end portion of a yoke 754f and also, the inner diameter of supporting holes 726b formed in the four corner portions of the yoke 754f is made sufficiently larger than the outer diameter of the outer races 136 (FIG. 6) constituting the radial needle bearings 135 for supporting the first and second pivot shafts 133 and 134.

According to such structure of the present embodiment, the operation and effect of the aforedescribed first embodiment and the operation and effect of the aforedescribed fourth embodiment can all be provided.

While in any of the above-described embodiments, the yoke supporting the first trunnions 131 provided in the first cavity 529 and the yoke supporting the second trunnions 132 provided in the second cavity 530 are formed integrally with each other, the two yokes need not always be made integral with each other. One or both of the yokes provided so as to sandwich the cavities 529 and 530 therebetween may be made independent of each other for each cavity.

For example, in the case of a tenth embodiment shown in FIG. 27A, a square or rectangular restraining hole 827a is formed in the central portion of a yoke 863a provided in the first cavity 529 and the second cavity 530, and supporting holes 826a formed in the opposite end portions of the yoke 863a are slots. Also, in the case of an eleventh embodiment shown in FIG. 27B, a circular restraining hole 827 is formed in the central portion of a yoke 863b provided in the first cavity 529 and the second cavity 530, and supporting holes 826a formed in the opposite end portions of the yoke 863b are slots. Also, in the case of a twelfth embodiment shown in FIG. 27C, a square or rectangular restraining hole 827a is formed in the central portion of a yoke 863c provided in the first cavity 529 and the second cavity 530, and supporting holes 826b formed in the opposite end portions of the yoke 863c are circular holes having a diameter sufficiently larger than the diameter of the outer races 136 constituting the radial needle bearings 135. Further, in the case of a thirteenth embodiment shown in FIG. 27D, a square or circular restraining hole 827 is formed in the central portion of a yoke 863d provided in the first cavity 529 and the second cavity 530, and supporting holes 826b formed in the opposite end portions of the yoke 863d are circular holes having a diameter sufficiently larger than the diameter of the outer races 136 constituting the radial needle bearings 135.

Again in the structure of these embodiments, it is easy to support the first and second pivot shafts 133 and 134 in the supporting holes 826a and 826b, and the work of assembling the double cavity toroidal type continuously variable transmission can be made efficient. Also, during the operation of the continuously variable transmission, the inner peripheral surfaces of the supporting holes 826a and 826b and the outer peripheral surfaces of the outer races 136 slide only on a circumferential portion and therefore, it is not necessary to finish the entire inner peripheral surfaces of the supporting holes 826a and 826b, and a reduction in the working cost can be achieved.

What is claimed is:

1. A single cavity continuously variable transmission, comprising:

a casing, an input shaft, an input side disc rotatably supported on the input shaft, an output side disc disposed on the input shaft in opposed relationship with the input side disc, a pair of yokes provided substantially in parallel to each other adjacent to the input side disc and the output side disc with a rotation axis of the input side disc and the output side disc disposed therebetween, at least a pair of trunnions oscillating via pivot shafts present at twisted positions relative to the rotation axis of said two discs, said pivot shafts being formed on opposite end portions of said trunnions, and at least a pair of power rollers rotatably supported on displaceable shafts protruded from the inner sides of said trunnions, said power rollers being sandwiched between said input side disc and said output side disc, said yokes having restraining holes formed in intermediate portions thereof supported by a supporting portion secured to said casing or a member secured thereto, the pivot shafts of the trunnions being fitted to opposite end portions of said yokes, characterized in that said pair of yokes are fitted and supported on the supporting portion against movement along the rotation axis of said discs and movement along a rotation axis direction of said power rollers in a neutral state, but for oscillatory displacement in a plane perpendicular to a plane containing a center axis of the supporting portion and the rotation axis of said discs, and at least one of said yokes is fitted and supported on the supporting portion for movement in an axial direction of said pivot shafts.

2. A continuously variable transmission comprising: a casing, an input shaft rotatably supported by the casing, an input side disc rotatably supported on said input shaft, an output side disc rotatably supported on said input shaft in opposed relationship with the input side disc, a pair of power rollers disposed in an annular space between the input side disc and the output side disc in contact therewith, a pair of trunnions disposed adjacent to the power rollers so as to be located at twisted positions relative to the input shaft and rotatably supporting the power rollers by displaceable shafts uprightly provided on inner surfaces thereof and formed with pivot shaft portions on lengthwisely opposite end portions thereof, and a pair of yokes disposed adjacent to the input side disc and the output side disc substantially parallel to a line linking the power rollers together in a neutral state and supported at lengthwisely intermediate portions thereof by a supporting portion secured to the casing or a member secured thereto, said yokes supporting the pivot shaft portions of the trunnions at opposite ends of said yokes, characterized in that a rectangular restraining hole is formed in the lengthwisely intermediate portion of each of said yokes and circular holes are formed in the opposite end portions thereof, each of said yokes is supported against movement in the lengthwise direction of the supporting portion and in a direction perpendicular thereto and for oscillation in a plane extending in direction of thickness thereof, and at least one of said yokes is supported for movement in the direction of thickness thereof.

3. A unit of yokes and a supporting portion for a continuously variable transmission including a casing, an input shaft rotatably supported by the casing, an input side disc rotatably supported on the input shaft, an output side disc rotatably supported on the input shaft in opposed relationship with the input side disc, a pair of power rollers disposed in an annular space between the input side disc and the output side disc in contact therewith, a pair of trunnions disposed adjacent to the power rollers so as to be located at twisted positions relative to the input shaft, and rotatably supporting the power rollers by displaceable shafts uprightly provided on inner surfaces thereof and formed with pivot shaft portions on lengthwisely opposite end portions thereof, said unit comprising:

a pair of yokes adapted to be disposed adjacent to the input side disc and the output side disc substantially parallel to a line linking the power rollers together in a neutral state, and to support opposite end portions of the pivot shaft portions of the trunnions, characterized in that said supporting portion supports a lengthwisely intermediate portion of each of said yokes, a rectangular hole is formed in the lengthwisely intermediate portion of each of said yokes, said supporting portion has a rectangular parallelepiped shape fitted in said rectangular hole of each yoke, a pair of outer sides of said supporting portion contacting with a pair of inner sides of one said rectangular hole opposed to each other in a lengthwise direction of that rectangular hole are curved surfaces, each of said yokes is supported against movement in a lengthwise direction thereof and a direction perpendicular to said lengthwise direction thereof and for oscillation in a plane extending in a direction orthogonal to a surface through which said rectangular hole thereof is formed, and at least one of the yokes is supported for movement in a direction of thickness thereof.

4. A double cavity continuously variable transmission comprising a casing, and input shaft, first and second outer discs supported on the input shaft for rotation in synchronism with each other with the inner sides thereof opposed to each other, a first inner disc supported on the input shaft with a side thereof opposed to the first outer disc and for rotation independent of said first and second outer discs, a second inner disc opposed to the second outer disc for rotation in synchronism with the first inner disc, a pair of yokes provided substantially parallel to each other sideways of the first and second inner discs with first end portions of said pair of yokes located between said first outer disc and said first inner disc and with second end portions thereof located between said second outer disc and said second inner disc, a pair of first trunnions present between said first outer disc and said first inner disc at twisted positions relative thereto and oscillating via first pivot shafts supported on said first end portions of said pair of yokes, a pair of first power rollers rotatably supported on first displaceable shafts protruding from inner sides of the first trunnions and sandwiched between opposing sides of said first outer disc and said first inner disc, a pair of second trunnions present between said second outer disc and said second inner disc at twisted positions relative thereto and oscillating via second pivot shafts supported on the second end portions of said pair of yokes, and a pair of second power rollers rotatably supported on second displaceable shafts protruding from inner sides of said second trunnions, said second power rollers being sandwiched between opposing sides of said second outer disc and said second inner disc, each of said yokes having supporting holes formed in four corners thereof and being formed with a restraining hole, each of said yokes having an associated supporting portion which is fixed to said casing or a member secured thereto and which is fitted in said restraining hole, the pivot shafts being fitted in the supporting holes of said yokes, characterized in that said restraining hole of each yoke is formed between a pair of said support holes and adjacent to an intermediate portion of one of opposite end edges of the yoke in the a rotation axis direction of each of the discs, and because of engagement between said restraining hole and said supporting portion, at least one of said pair of yokes is not movable on a plane intersecting with respective pivot axes of said pivot shafts perpendicularly thereto and oscillation-displaceable about an axis parallel to the rotation axis of each of said discs and further, said at least one yoke is fitted and supported on the associated supporting portion for movement along the pivot axes of said pivot shafts.

5. A double cavity continuously variable transmission according to claim 4, wherein said first and second pivot shafts are supported in supporting holes formed in the corner portions of each of said yokes to pivotally support the first and second pivot shafts by bearings each provided with an outer race of which the outer peripheral surface is a spherical convex surface and the inner peripheral surface is a cylindrical surface, and each of said supporting holes is a circular hole having an inner diameter larger than the outer diameter of said outer race.

6. A double cavity continuously variable transmission according to claim 4, wherein said first and second pivot shafts are supported in supporting holes formed in the corner portions of each of said yokes to pivotally support the first and second pivot shafts by bearings each provided with an outer race of which the outer peripheral surface is a spherical convex surface and the inner peripheral surface is a cylindrical surface, and each of said supporting holes is a slot long in a direction perpendicular to the direction of the rotation axis of each of said discs.

7. A double cavity continuously variable transmission according to claim 4, wherein said supporting portion of said one yoke has a rectangular parallelepiped shape inserted in the rectangular restraining hole thereof, and a pair of outer sides contacting with a pair of inner sides opposed to each other in the lenghthwise direction of the restraining hole are curved surfaces.

8. A double cavity continuously variable transmission provided with a casing, an input shaft, first and second outer discs supported on the input shaft for rotation in synchronism with each other with the inner sides thereof opposed to each other, a first inner disc supported on the input shaft with the inner side thereof opposed to the first outer disc and for rotation independent of said first and second outer discs, a second inner disc supported in opposed relationship with the second outer disc and for rotation in synchronism with the first inner disc, two pairs of yokes provided substantially in parallel to each other sideways of the first and second inner discs with these disposed therebetween and with a first pair thereof located between said first outer disc and said first inner disc and with a second pair thereof located between said second outer disc and said second inner disc, a pair of first trunnions present between said first outer disc and said first inner disc at twisted positions relative thereto, and oscillating via first pivot shafts supported on end portions of said first pair of yokes, a pair of first power rollers rotatably supported on first displaceable shafts protruding from inner sides of said first trunnions and sandwiched between opposing sides of said first outer disc and said first inner disc, a pair of second trunnions present between said second outer disc and said second inner disc at twisted positions relative thereto, and oscillating via second pivot shafts supported on end portions of said second pair of yokes, and a pair of second power rollers rotatably supported on second displaceable shafts protruding from inner sides of said second trunnions and sandwiched between opposing sides of said second outer disc and said second inner disc, each of said yokes having a supporting portion therefor which is fixed to said casing or a member secured thereto, said supporting portion for each yoke being fitted in a restraining hole formed in a portion of said yoke with two of the pivot shafts being fitted in supporting holes formed in two end portions of said yoke, characterized in that said restraining hole is formed between said supporting holes adjacent to an intermediate portion of one of the opposite end edges of the yoke in a rotation axis direction of each of the discs, and because of engagement between said restraining hole and said supporting portion, at least one of the yokes of each pair is not movable on a plane intersecting with an axial direction of said pivot shafts perpendicularly thereto and is oscillation-displaceable about an axis parallel to the rotation axis of each of said discs and further, is fitted and supported on the associated supporting portion for movement in the axial direction of said pivot shafts.

* * * * *